Figure 1:
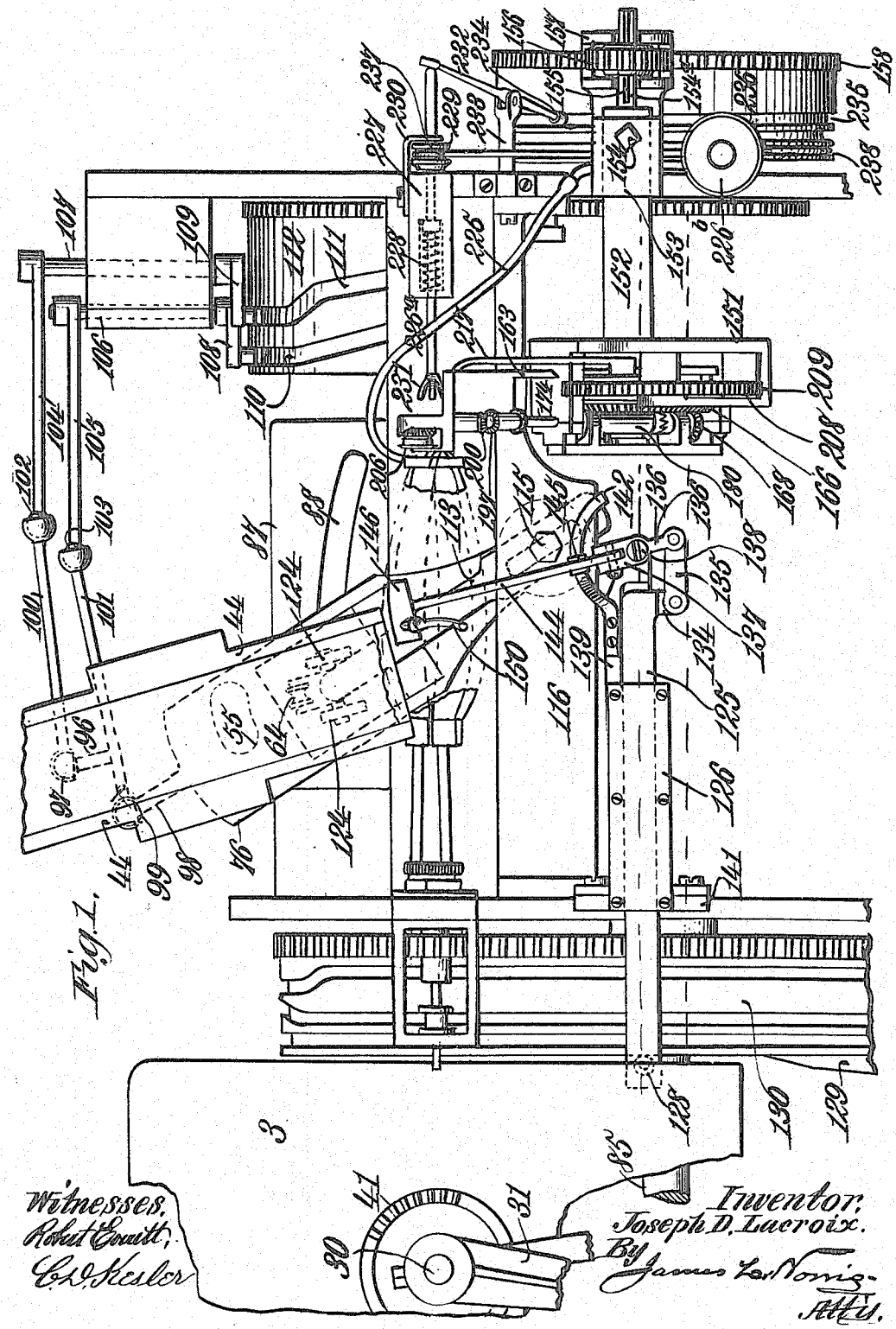

J. D. LACROIX.
CIGAR MAKING MACHINE.
APPLICATION FILED FEB. 21, 1905.

1,128,990.

Patented Feb. 16, 1915.

7 SHEETS—SHEET 1.

Witnesses
Robert Court
C. L. Kesler

Inventor
Joseph D. Lacroix
By James L. Norris
Atty.

J. D. LACROIX.
CIGAR MAKING MACHINE.
APPLICATION FILED FEB. 21, 1905.

1,128,990.

Patented Feb. 16, 1915.

7 SHEETS—SHEET 2.

Witnesses.
Robert Ewratt,
C. D. Kesler.

Inventor.
Joseph D. Lacroix.
By James L. Norris.
Atty.

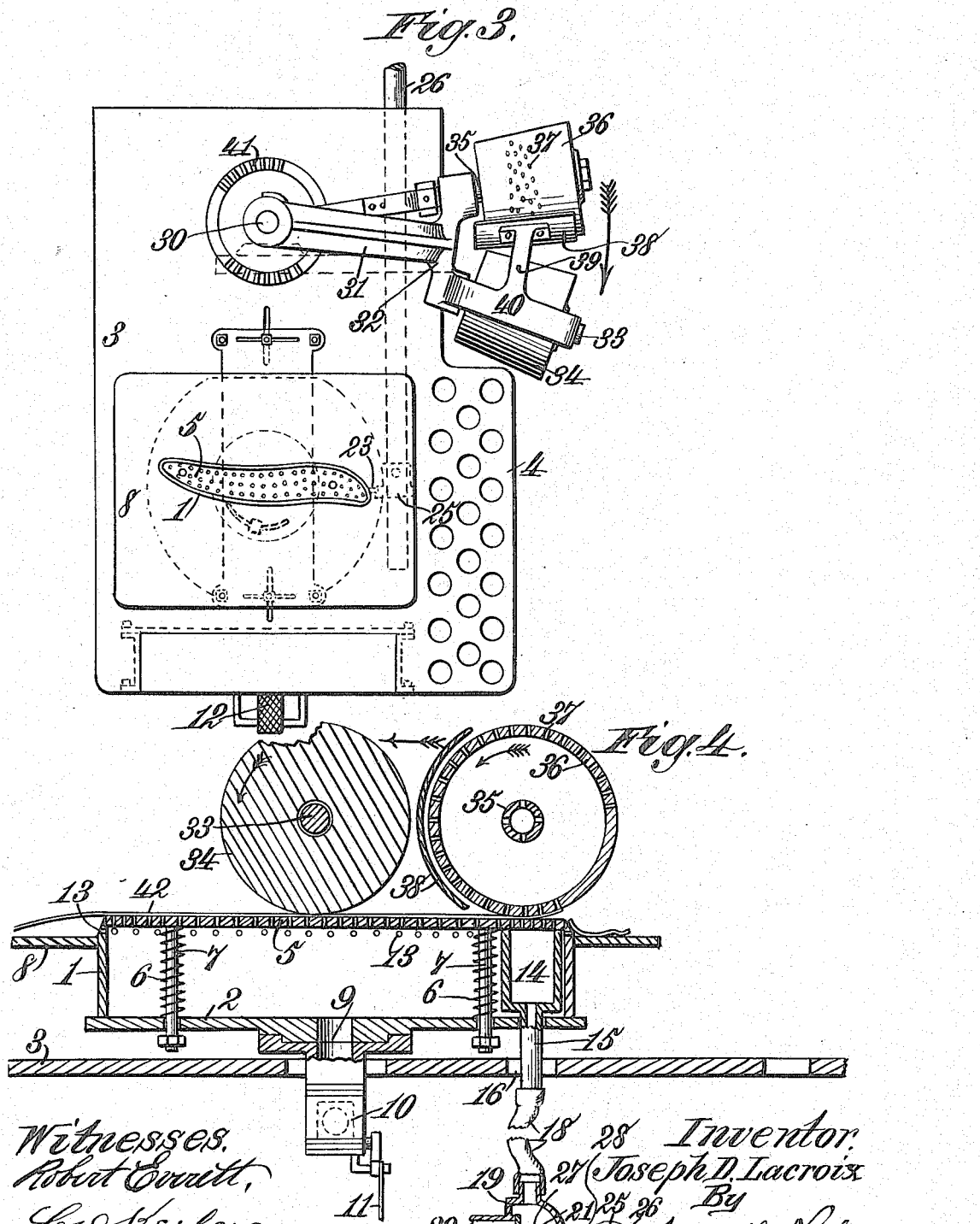

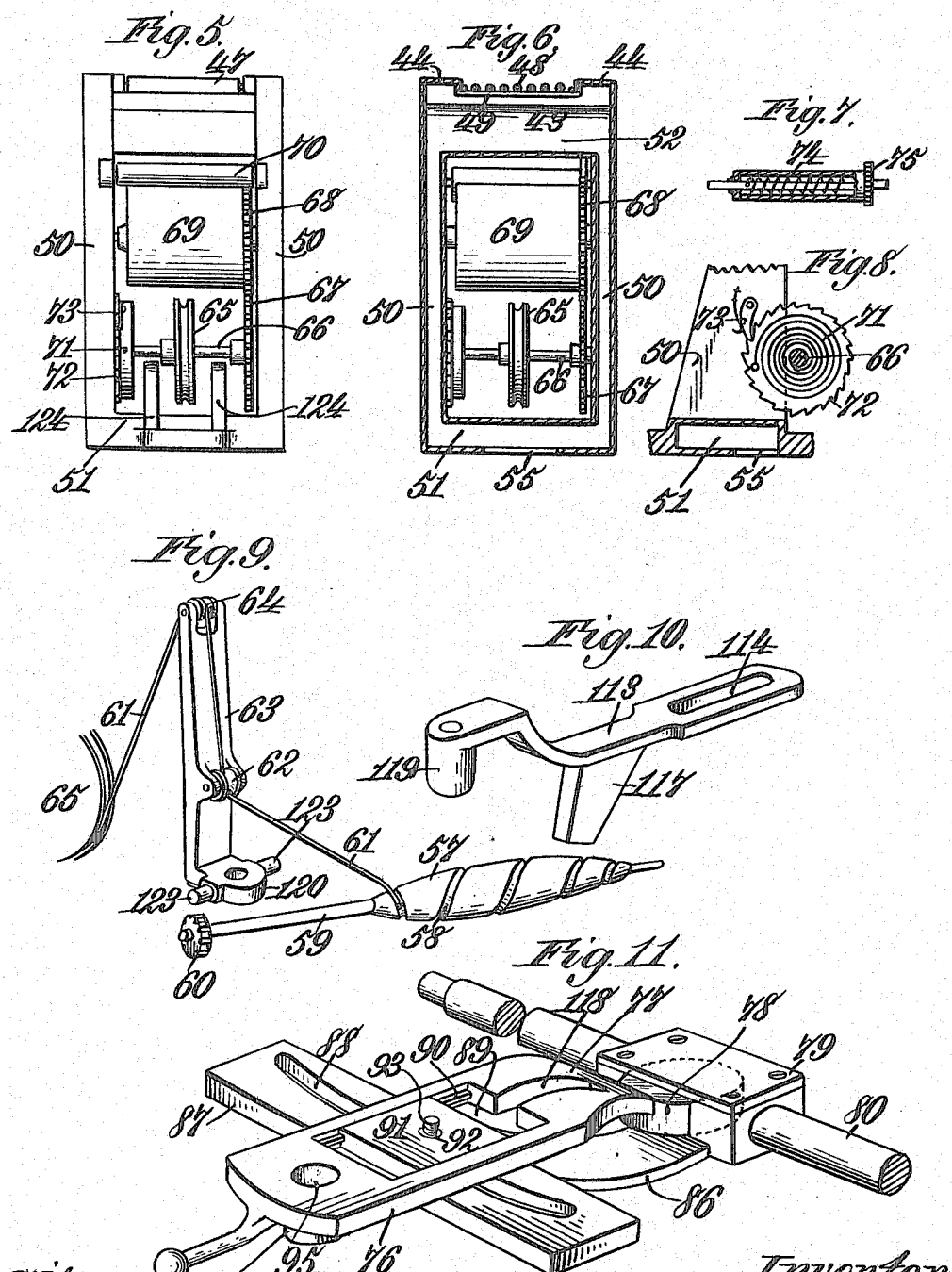

J. D. LACROIX.
CIGAR MAKING MACHINE.
APPLICATION FILED FEB. 21, 1905.
1,128,990.
Patented Feb. 16, 1915.
7 SHEETS—SHEET 5.
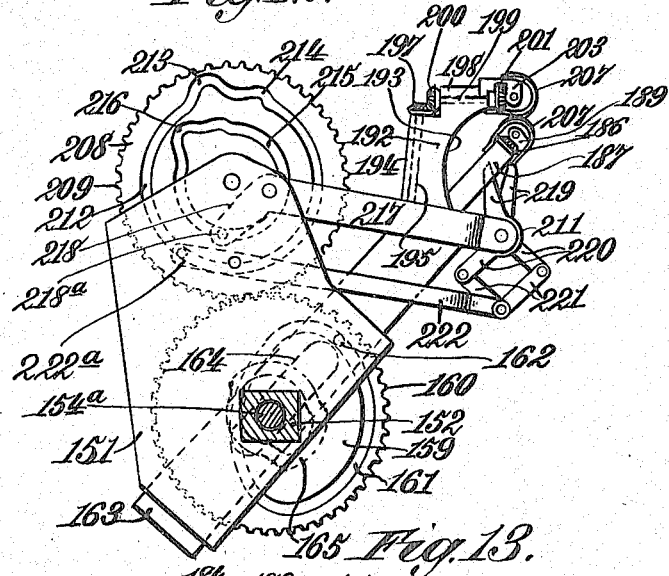
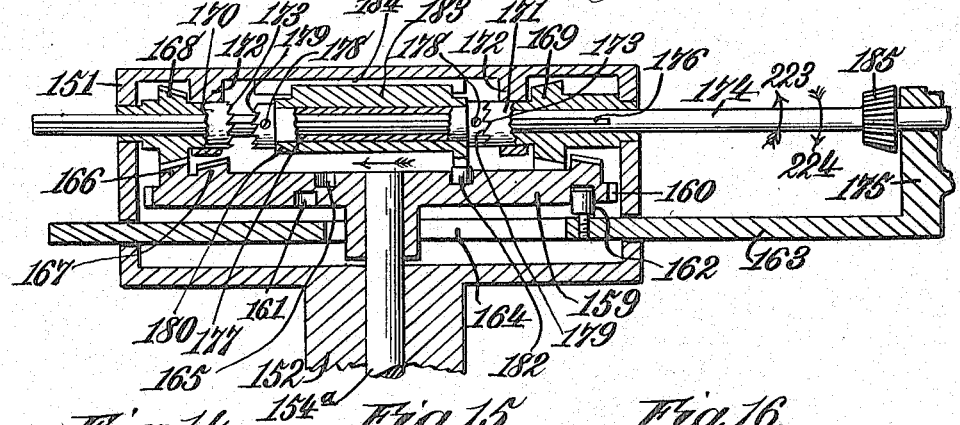
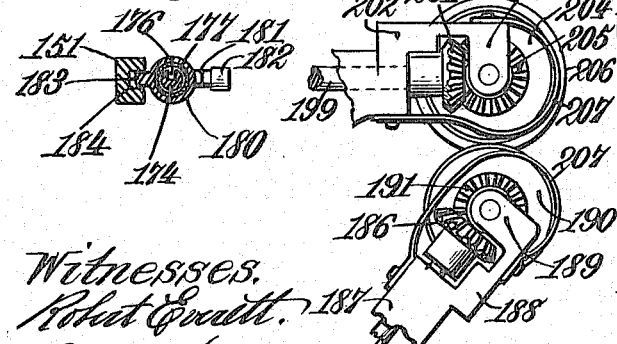
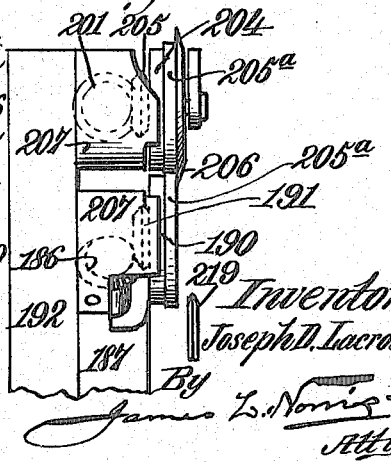
Witnesses.
Robert Everitt.
C. D. Kesler.
Inventor.
Joseph D. Lacroix.
By James L. Norris
Atty.

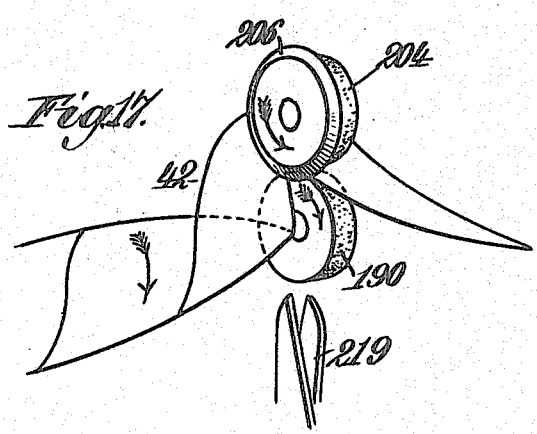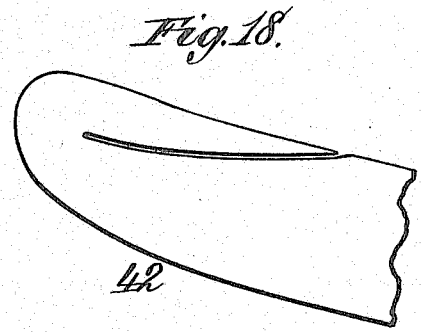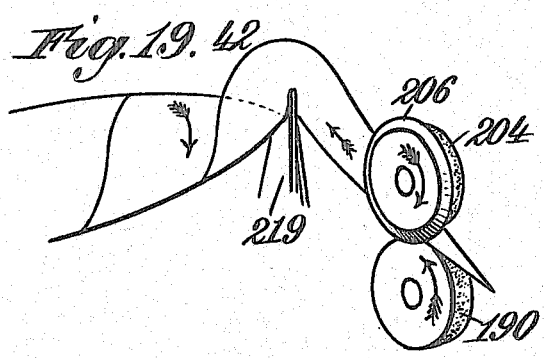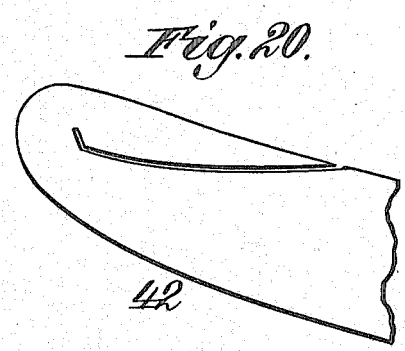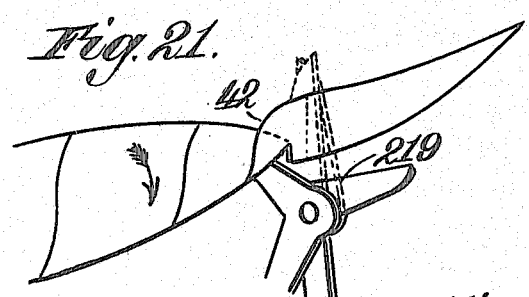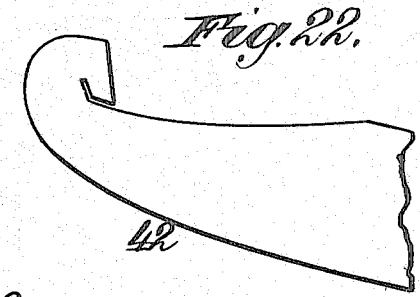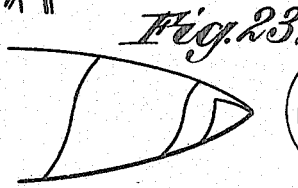

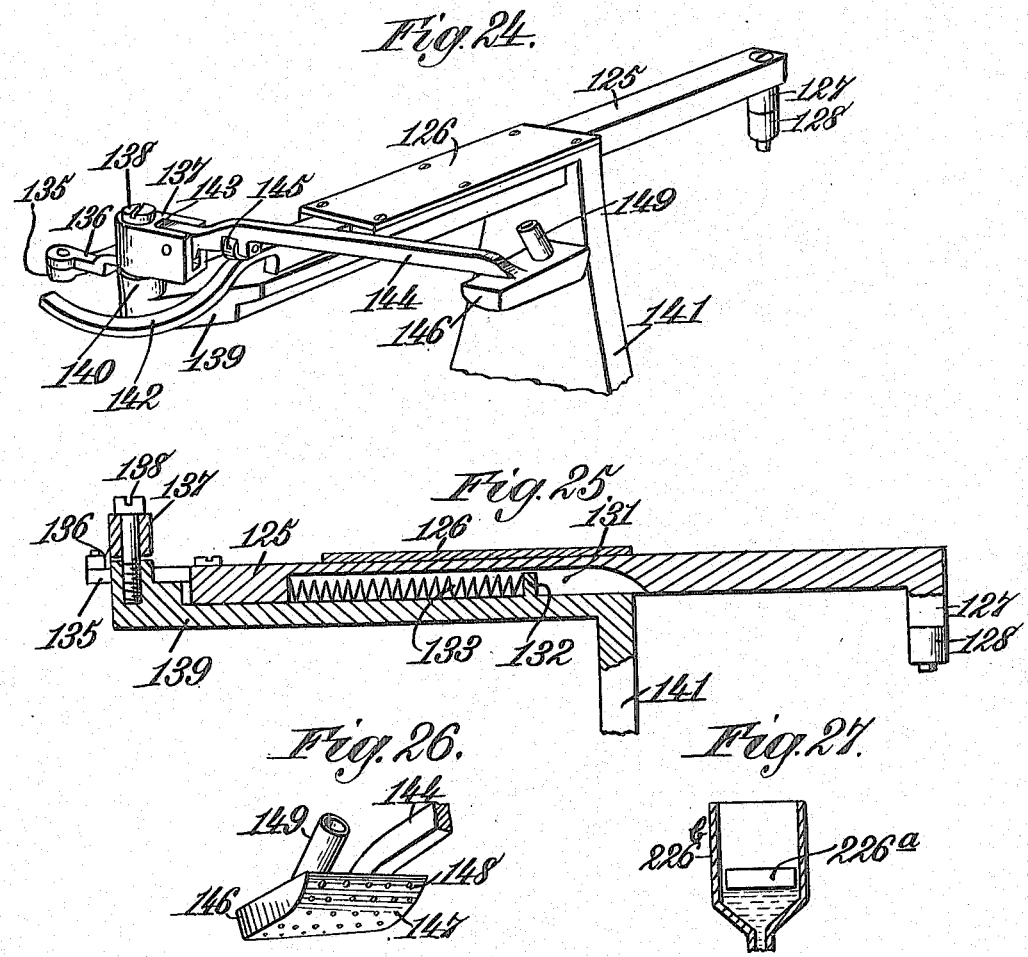

UNITED STATES PATENT OFFICE.

JOSEPH D. LACROIX, OF NEW ORLEANS, LOUISIANA, ASSIGNOR TO EUGENE H. DAVIS, OF NEW YORK, N. Y.

CIGAR-MAKING MACHINE.

1,128,990.     Specification of Letters Patent.     Patented Feb. 16, 1915.

Application filed February 21, 1905. Serial No. 246,729.

*To all whom it may concern:*

Be it known that I, JOSEPH D. LACROIX, a citizen of the United States, residing at New Orleans, in the parish of Orleans and State of Louisiana, have invented new and useful Improvements in Cigar-Making Machines, of which the following is a specification.

This invention relates to cigar making machines, and particularly to wrapper mechanism of that class wherein the wrapper is cut and fed or delivered to devices holding a bunch for automatic application to the latter.

The purpose of the invention is, in a comparatively simple manner, to economically and expeditiously cut a wrapper, hold the surplus portion of the leaf, or part of the leaf from which the wrapper is cut, intact with the cutting mechanism, and regularly pick up the cut wrapper, while being cut, from the latter mechanism and transfer it to a feeder forming part of the wrapper applying mechanism and operative in conjunction with means for holding a bunch, which may be hand or machine made.

The mechanism, embodying the features of the present invention, may be used with any machine arranged to automatically form a bunch or with a number of such machines, and further, the improved mechanism may be used in series or a number of similar mechanisms disposed adjacent or in operative relation to a like number of bunch forming mechanisms, and all the mechanisms, including those for forming the bunch and the wrapper preparing and applying mechanisms may be operated from a single line shaft or a number of shafts, in proper timed relation.

One of the most essential features of the present invention is a practical assemblage of elements for regularly feeding a wrapper to a bunch and automatically causing the wrapper to conform to the shape of the bunch without the least slackness of the overlap of the edges of the wrapper applied, or imperfection in the production of the head or double cone formation which is produced by part of the mechanism having an automatic cutting and heading action.

The invention also embodies incidental devices advantageously coöperating with the several main organizations, including the wrapper cutting, wrapper picking up and transferring, feeding and applying and heading or double cone forming mechanisms, and especially for causing the wrapper feeding mechanism to automatically compensate for variations in diameter throughout the length of a bunch through the medium of dependent and independent movable parts.

Figure 2:
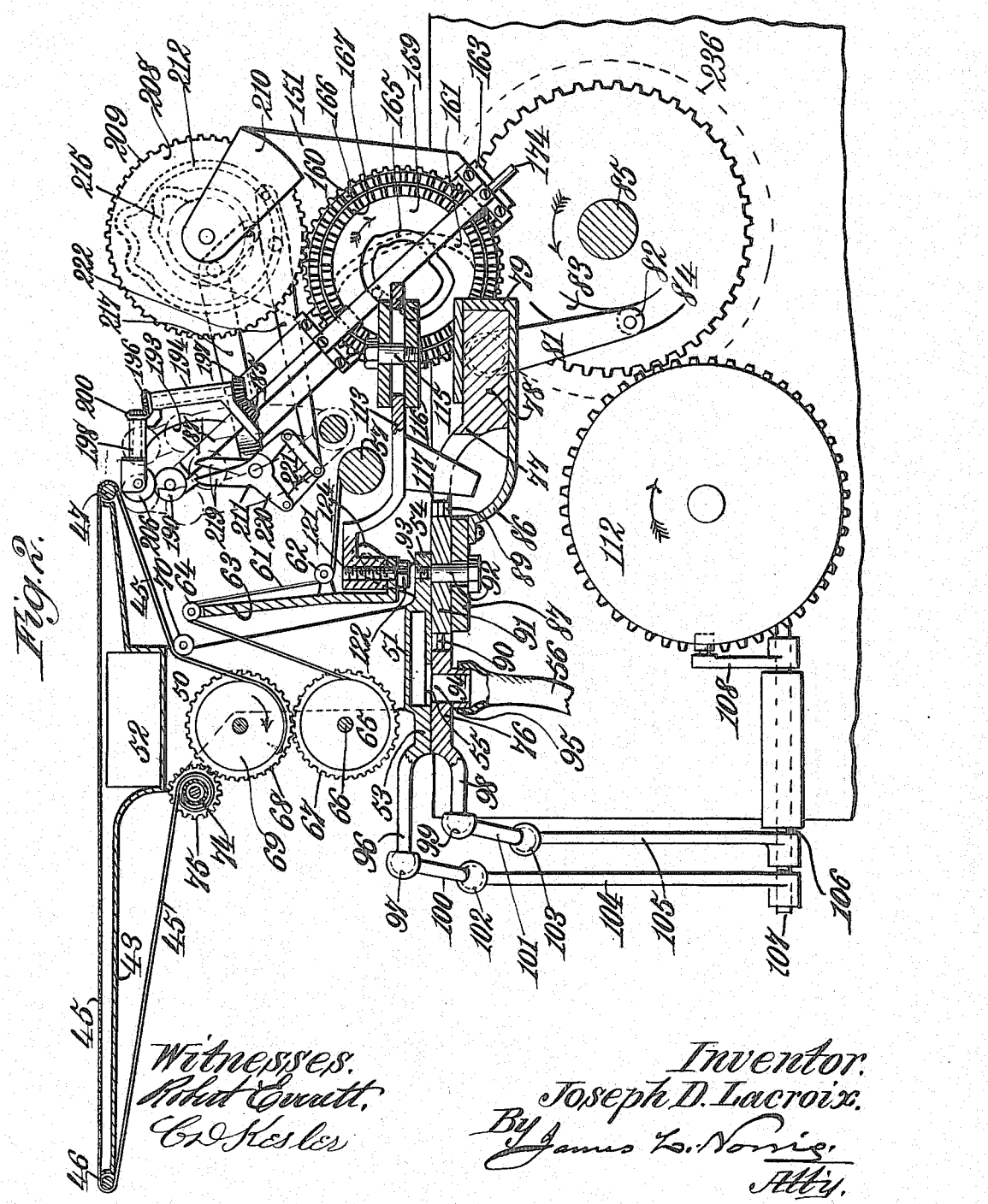

In the drawings:—Figure 1 is a top plan view of a portion of the machine, particularly showing the wrapper feeding or delivering devices, bunch holding means, and head cutting and completing elements together with operating mechanism. Fig. 2 is a transverse vertical section through a portion of the machine. Fig. 3 is a top plan view of the wrapper cutting and picking up and transferring devices, the die being clear. Fig. 4 is a transverse vertical section of the wrapper cutting mechanism, pressure and pick up or transfer rollers, the latter being shown as moving over the die to successively cut and pick up the wrapper. Fig. 5 is a detail inner end elevation of the wrapper carrier and feeder. Fig. 6 is a transverse vertical section approximately through the center of wrapper carrier and feeder. Fig. 7 is a detail longitudinal section of the carrier and feeder belt rewinding device. Fig. 8 is a detail longitudinal vertical section of a portion of the wrapper feeder support showing the spring, ratchet and pawl mechanism for governing the winding of the cord or chain coöperating with the wrapper feeder actuator or controller. Fig. 9 is a detail perspective view of the wrapper feeder actuator or controller, movable guide device for the cord or chain, and a portion of the drum or winding wheel for the cord or chain. Fig. 10 is a detail perspective view of an automatically adjustable fulcrum arm for the guide device for the cord or chain of the wrapper feeder actuator or controller. Fig. 11 is a detail perspective view of the mechanism for controlling the variable movement of the wrapper feeder and coöperating parts. Fig. 12 is a transverse section through a part of the machine showing the head forming mechanism in side elevation. Fig. 13 is a longitudinal vertical section through a part of the head forming mechanism. Fig. 14 is a detail cross section of a portion of the head forming mechanism and a guide. Fig. 15 is a detail side elevation of the rotary head cutters and holders and the operating devices therefor. Fig. 16 is an enlarged detail front view of the mechanism shown by Fig. 15. Fig. 17 is a detail perspective view of a portion of a bunch showing the wrapper partially applied and the rotary head cutters and holders and clipper, illustrating the first position and operation of the latter. Fig. 18 is a plan view of the head extremity of the wrapper showing the cut therein formed by head cutters in the position shown by Fig. 17. Fig. 19 is a view similar to Fig. 17, showing the rotary head cutters in their second position and receding over and tautly holding the head extremity of the wrapper and the first position and operation of the clipper. Fig. 20 is a plan view of the head extremity of the wrapper showing the shape of the cut therein after the first operation of the clipper subsequent to the similar operation of the rotary cutters. Fig. 21 is a view similar to Figs. 17 and 19, showing the rotary cutters as having fully receded or assumed a lowered normal position to completely free the head extremity of the wrapper and the severing or head finishing position of the clipper. Fig. 22 is a plan view of the head extremity of the wrapper when finished by the clipper in the position shown by Fig. 21. Fig. 23 shows views in side and end elevation of the headed extremity of a cigar, illustrating the double cone head formation produced by the operations of the rotary head cutters and holders and the clipper. Fig. 24 is a detail perspective view of the auxiliary pressure mechanism for maintaining an equality of pressure on the wrapper with respect to the bunch when the retention of the wrapper by the wrapper feeder is somewhat relaxed. Fig. 25 is a longitudinal vertical section of the mechanism shown by Fig. 24. Fig. 26 is a detail perspective view of the auxiliary pressure head. Fig. 27 is a detail cross sectional view of the paste reservoir, showing a weight therein.

Similar characters of reference are employed to indicate corresponding parts in the several views.

The wrapper cutting and transferring mechanism, shown particularly in Figs. 3 and 4, comprises a die 1, of a shape to conform to that of the wrapper and supported upon a platform or table 2, which is adjustable in different directions, as in my previous machines, to insure proper coöperation between the die and the pressure means engaging the wrapper disposed over said die to perform the cutting operation and also to economically cut wrappers from leaves having different characteristics as to shape or partial injury or breakage. The platform or table 2 is disposed on a bed 3, provided with a perforate ledge 4 for the support of the parts of tobacco leaves after the wrappers are formed. A perforated die-bed 5 is held within the die 1 and normally positioned close to the cutting edge of the die. The die-bed 5 snugly engages the inner surface of the walls of the die, and is held up in its normal position by springs 6 surrounding guide-pins 7 connected to the die-bed and movable through the platform or table 2. The advantage of this movable die-bed is that it will give way or depress sufficiently to compensate for the thickness of the wrapper cut from the leaf placed on the die under the influence of pressure means movable over the latter, and also bring up the cut wrapper at such elevation that it may be readily picked up and transferred, by a mechanism which will be more fully hereinafter set forth. A ledge or flange 8 surrounds the upper part of the die to hold down the leaf or material to be cut, or in other words prevent movement of the latter while the cutting operation is being pursued, in a manner which will be more fully hereinafter set forth, and also to receive the portion of the leaf remaining after the wrapper is cut therefrom to insure a clearance of the cutting edge of the die. The die has a suction pipe or conduit 9 communicating therewith through the center of the platform or table 2 and provided with a valve 10, operative by any suitable means, but in the present instance having a depending connection 11 attached to a foot treadle 12, whereby the valve may be quickly actuated to control the suction medium with respect to the die. The die 1 has tightly closed ends and sides, with the exception of a series of perforations 13 therein immediately above the flange or ledge 8, but below the plane of the under side of the die bed, the purpose of such openings being to create a suction on the overhanging portion of the leaf and draw the surplus leaf downwardly close onto the flange or ledge to insure a clean cutting operation to prevent movement of the leaf during cutting of the latter, and also prevent interference with the pick-up and transferring devices, and obviate the removal from the die of any portion of the leaf except the cut wrapper held on the die-bed within the cutting edge of the die. The leaf or portion of a leaf is held on the die only long enough to permit the cutting operation just explained to become effective, when the leaf or portion of a leaf is again positioned or relaid with respect to the die by an operator. The die or body of the latter has formed, at what may be termed its front extremity or end, an independent suction box or chamber 14, which depends from the die-bed and is movable with the latter. From the bottom of the independent chamber 14, a suction or exhaust connection 15 extends loosely through the platform or table 2 and also through an opening 16 in the bed 3 of this part of the mechanism, and has attached to the lower end thereof a flexible coupling or tube 18, communicating with the upper portion of a valve casing 19, on the terminal of a suction or exhaust pipe 20, which may extend away or connect with a suitable suction creating or an exhausting apparatus or mechanism, and with which also the valve 10 of the tube or pipe 9, having communication with the die through the platform or table, coöperates. The valve casing 19 is formed with a suitably shaped valve chamber 21, and therein a valve 22 is hinged and normally bears, when free, against the end of the pipe 20. The valve 22 has an arm 23 connected to the lower portion thereof and projected outwardly beyond the bottom of the casing 19, said arm being depressible against the resistance of a spring 24. The valve 22, through the medium of the projecting arm 23, is opened by a cam 25 fixed on a shaft 26, operated in regular timed relation through the main actuating mechanism, the said cam having a recess 27 with an inclined terminal wall 28 and an abrupt drop terminal 29. The inclined terminal wall 28 first strikes the end of the arm 23 and the latter is held depressed as long as it is in engagement with the circumference of the cam, which, in the present instance, is concentric with relation to the shaft 26, but as soon as the drop terminal 29 of the recess 27 arrives opposite the end of the arm 23, the latter is free and the spring 24 automatically closes the valve. By this means the suction or exhaust is cut off automatically from the chamber 14 of the die-body at such intervals that the pick-up and transferring device may be free to operate with the cut wrapper resting on the die-bed and normally held against the latter, by the suction or exhaust exerted thereon through the series of perforations in the die-bed, said perforations being continued over the chamber 14.

Coöperating with the die are cutting pressure and pick-up devices held in positive spaced relation, but having an individual rotation, as well as united circular movement around an axis with relation to which they are radially disposed. This axis consists of a tubular post 30, projecting upwardly through the bed 17 at a suitable distance from the position of the die 1 and having a main arm or support 31 projecting therefrom and provided with an outer yoked terminal 32 respectively for the support of the shaft 33 of the cutting pressure device 34, which is in the form of a cylindrical roller which may be conical or of other form free to rotate on said shaft, and for the tubular shaft 35 of a pick-up and transferring device 36, in the form of a hollow similarly shaped roller, and having a series of perforations 37 therein. The hollow shaft 35 of the pick-up and transferring device 36 projects inwardly and communicates with the hollow post 30 and the latter, in turn, will be connected to the suction or exhaust creating means, in all respects similar to the construction and arrangement illustrated in my pending application, Sr. No. 126,739. The mechanism for operating the post 30 and for controlling the intermittent movement of the rollers 34 and 36, together with the arm 31, is also similar to that illustrated in the aforesaid application and forms no part of the present invention, the essential feature, in the present instance, being the contiguous arrangement of the cutting roller 34 and the pick-up and transferring roller 36. The cutting roller 34 is loose on its shaft to reduce grooving thereof, by the cutting edge of the die 1, to a minimum, and to vary the surface of the said roller brought in contact with the die and thus prolong the life of the roller by avoiding the formation of a positive groove in the surface thereof, conforming in contour to the shape of the cutting edge of the die, and which would soon render the roller inefficient as a pressure means, to effect the practical cutting of the wrapper. The series of openings 37 in the pick-up and transferring roller 36 has a marginal contour corresponding precisely to the outline or shape of the die to cause an accurate registration of the said openings with the die and its bed. As in the application heretofore referred to, a suction or exhaust is exerted through the roller 36, and to prevent such suction or exhaust force from exerting the least influence on the cut wrapper held by the die at an improper time, or of the suction or exhaust of the die on the wrapper on the roller 36, a fender or guard 38 is held in advance of the said roller 36, by an arm 39 projecting rearwardly from a yoke 40 arranged over the roller 34 and terminally connected to the bearings for the shaft 33 of said latter roller, as shown by Fig. 3. This fender or guard is shown as preferably used with the die having the perforations or openings 13, the latter and the guard both operating to prevent displacement of the overhanging portion of the wrapper or material on the die, and in some instances either one of these structures will be used without the other. In this combination construction also an essential difference resides with respect to my previous machines by reason of the free rotation of the roller 34 and the limited or interval rotation of the roller 36, it being obvious that the said roller 36 should have rotation only at the time it is passing over the die to remove or pick up the cut wrapper simultaneously as the wrapper is cut, and to deliver the wrapper to the wrapper feeding mechanism, including a carrier, which will be more fully hereinafter explained, and for producing this intermittent motion, a mutilated bevel gear 41 is held on the post 30 and is engaged by a gear carried by the shaft 35, as fully illustrated and described in the application hereinbefore noted. It will be understood, however, that both rollers 34 and 36 swing in a horizontal plane in a circular path and furthermore, that the actuating devices, both in their preliminary and secondary form, will have a proper timed operation with respect to the shaft 26.

The mechanism as thus far described may be used independently of any of the accompanying devices, which will be hereinafter enumerated and the wrappers as removed from the die by the pick-up and transferring device or roller might be delivered to a suitable receptacle or table of any preferred form, adapted for the purpose and further transferred to other mechanism by hand or removed and manually applied to cigar bunches.

The operation of this wrapper-cutting and pick-up and transferring device is as follows:—The motive organization, including the shafts 26 and post or shaft 30, is set in motion and a tobacco leaf manually applied to the die, the operator having opened the valve 10 to permit suction to be exerted on the leaf, and at about the same time, or previous to the disposition of the leaf on the die, the shaft 26 will have turned sufficiently to bring the cam 25 into engagement with the arm 23 of the valve 22 to establish a suction influence in the chamber 14 and through the part of the bed 5 extending thereover. At a proper interval the cutting pressure device or roller 34 engages the front end of the die 1 and traverses the latter completely to sever the wrapper from the leaf, the surplus portion of the leaf being held downwardly by the suction exerted through the openings 13 onto the flange or ledge 8, to insure a free elevation of the cut wrapper from the bed. About the time that the pressure cutting device or roller 34 reaches the center of the die, or approximately the center of the latter, the pick-up and transferring device or roller 36 begins to pass onto the front end of the die over the chamber 14, and at such moment the shaft 26 will have revolved sufficiently to bring the drop terminal 29 of the cam 25 opposite the arm 23 of the valve 22 and the spring 24 will immediately close said valve and shut off the suction from the chamber 14. By this means the roller 36 automatically operates to pick up the wrapper as the latter is cut, an operation essentially different from machines of this class as heretofore arranged. By thus shutting off the suction from the chamber, the suction is exerted on the terminal of the wrapper through the series of openings 37 of the pick-up and transferring roller 36 and a sufficient length of the leaf is caused to be drawn against the roller 36 to overcome any resistance to removal of the cut wrapper within the confines of the die cutting edge, and gradually the wrapper will be wound and held firmly on the roller 36. It will be understood that the suction exerted on the cut wrapper through the die-bed has only such force as to maintain the cut wrapper in positive position until it is practically taken up by the roller 36. In some instances, the operator will actuate the treadle 12 to reduce the suction through the die-body and bed 5 without interfering with the downward holding of the surplus portions of the leaves on the flange or table 8, or loosening, or allowing the leaf, in advance of the roller 34, to have loose assemblage on the cutting edge of the die. Another consideration with respect to the suction exerted through the die-body and the roller 36, is that the suction force in the latter is just strong enough to overcome the resistance of the suction of the die body, or in other words, the suction force through the roller 36 will be strong enough to lift the cut wrapper from the die without the least injury thereto. The wrapper may be transferred by the roller 36 to any point or receptacle desired, and in some instances directly to the bunch holding means, but in the present organization, illustrating a preferred arrangement of coöperating mechanism, the wrapper picked up by the said roller 36 will be preferably transferred to a traveling feeding mechanism, and during such transfer an equal tension is maintained on the entire wrapper area, such tension being uniformly preserved until the wrapper is placed on the feeding mechanism, and after the wrapper has been so placed, the suction of the feeding mechanism is exerted on the wrapper and holds the latter under stretching tension. After the pick-up and transferring device or roller 36 has fully traversed the die 1 and removed the cut wrapper, said roller and the roller 34 swing over, through the rotation of the post or tubular shaft 30, to a wrapper carrier and feeding mechanism, or to mechanism controlling application of the wrapper 42, the pick-up or transferring roller 36 moving longitudinally over the said carrier and feeder and depositing the wrapper thereon. This wrapper carrier and feeder is similar in many respects to the like devices embodied in my previous machines, or those forming the subject matter of prior pending applications and especially in application, Sr. No. 126,739, heretofore referred to. The main body of the carrier and feeding mechanism consists of a box-like table or support 43, between the side rims 44 of which a belt or other analogous conveying device 45 is movably mounted and engages rollers 46 and 47 at opposite ends of the table. As in my previous constructions, the belt moves over a supporting grating, composed of a series of upper longitudinally arranged rods or wires 48 having under cross brace wires 49. These wires prevent the belt from being drawn inwardly into the table and always maintain it in flat condition to facilitate the feed of the wrapper deposited thereon, especially in view of the suction or exhaust force which is exerted through the belt to firmly hold the wrapper in position. The belt 45 is perforated and the table or support 43 thereunder is of air-tight construction. Furthermore, the edges of the belt will be assembled in such close relation to the sides of the table or support which it engages that the suction or exhaust force will be exerted mainly through the openings in the belt. The table 43 is held in elevated position by tubular standards 50 communicating, at their lower ends, with a tubular base 51 and at their upper ends with a chamber 52, located nearer the inner than the outer end of the table 43. The chamber 52 may be constructed either as a part of the table 43 or, in other words, portions of the table may be utilized in the formation thereof, or this chamber may be independently constructed and mounted in the table, the detail arrangement of the parts or a special construction of said chamber being unnecessary and not essential so long as such chamber will perform the function desired. The tubular base 51 has front and rear solid flanges or extensions 53 and 54, and in the bottom of the tubular portion of said base is an opening 55, with which a suction or exhaust pipe 56 has connection, said pipe also extending away to the common suction or exhaust creating means for the machine. When the entire machine is set in motion, the suction or exhaust begins to operate through the belt 45 simultaneously with a similar operation in the die 1, chamber 14, and pick-up and transferring roller 36 heretofore set forth, and when the pick-up and transferring roller 36 begins to move over the belt 45, the suction or exhaust thereon will be shut off or reduced, as desired, to permit the suction or exhaust through the said belt 45 to deliver the wrapper regularly from the roller 36 to the belt. The chamber 52 acts as an intermediate suction or exhaust influencing medium and it is obvious that the greatest suction or exhaust force through the belt 45 will be near or adjacent to the said chamber, and the purpose of this arrangement is to increase the retention of the wrapper on the belt as it is fed to the bunch supporting means or holding rolls in order to maintain the said wrapper in proper taut condition as it is applied to the bunch.

The means for imparting movement to the belt 45 comprises an actuator or controller 57, see Fig. 9, the same consisting of a cigar-shaped element having a continuous spiral groove 58 and carried by a shaft 59, with a terminal pinion 60, which is engaged by a gear on a shaft having a second gear disposed in the path of movement of a mutilated operating gear, as disclosed in Fig. 1ª of my pending application, Sr. No. 220,920. By means of this arrangement an intermittent movement is imparted to the actuator and controller 57 in timed relation to the remaining parts of the mechanism coöperating therewith to feed the wrapper, disposed on the belt, to the bunch held by the rolls or other suitable means. A cord or chain 61 is secured to one terminal of the actuator and controller 57 and from this passes under and over a direction or guide sheave 62, on a swiveled upright or compensator 63 and also over a direction or guide sheave 64 at the upper end of said upright. From the direction or guide sheave 64, the cord or chain 61 passes down to and around a rotary element or pulley 65, secured on a shaft 66, terminally held in suitable bearings on the standards or legs 50 of the table or support 43 and centrally with relation to the latter. On one terminal of the shaft 66, as shown by Fig. 5, a gear 67 is keyed and is held in continual mesh with a similar gear 68 on one end of a drum 69, above the rotary element, or pulley 65, and to which the inner end of the belt 45 is secured, the belt being guided or directed to the drum by a roller or analogous device 70 held between the inner upper portions of the standards or legs 50. The shaft 66 has one end of a coil spring 71 secured thereto, the opposite end of said spring being attached to the ratchet-wheel 72 loose on the shaft and engaged by a pawl 73 secured to one of the standards or legs 50 of the table or support 43. The purpose of this spring and ratchet and pawl is to institute sufficient winding tension with respect to the shaft 66 and rotary element or pulley 65 to always maintain the cord or chain 61 in taut condition and to practically effect the operation sought by the use of the actuator and controller 57. Adjacent to and above the drum 69 is a spring actuated barrel or winding device 74, shown in detail in Fig. 7, and having on one end a pinion 75 continually meshing with the gear 68 of the drum 69. The opposite terminal of the belt 45 is attached to this barrel and as the belt is drawn inwardly toward the bunch held in the rolls therefor, and wound on the drum 69, the spring of the barrel 74 is contracted and the belt gradually unwinds from the barrel so that when a wrapper has been fully fed from the belt to the bunch, and which will occur when the shaft 59 ceases to rotate through the gearing heretofore explained and disclosed by my pending application, Sr. No. 220,920, the belt will return to normal position or unwind automatically from the drum 69 and pass over the table 43 and wind on the spring barrel ready for a succeeding like operation. At the same time, the cord or chain 61 will be unwound from the actuator and controller 57 and wind on the rotary element or pulley 65 through the influence of the spring 71, the several winding devices acting in unison by reason of the connected gears 67 and 68 and the pinion 75. Instead of using a cord or chain 61 with the actuator or controller the latter could be operated as a cam or have suitable gear teeth cut therearound, or a gear means to coöperate therewith.

The base 51 and its extensions 53 and 54 are movably held on means for regulating the position of the table 43 and the belt 45 coöperating therewith as to its position with respect to the bunch to impart to the table and belt varying angular and approaching and receding movements in conformity to the bunch, in order to apply the wrapper regularly and with proper tension, the rapidity of feed of the wrapper by the belt being independently regulated, in proportion to the variation in the diameter of the bunch, by the actuator and controller 57, which is an exact counterpart of the cigar to be produced or completed, this latter operation resulting from a variation in the time required for the cord or chain 61 to coil over or around the actuator and controller, in view of the variation in diameter throughout the length of the latter and corresponding to the shape of the cigar to be formed. The devices or operating mechanism, on which the base 51 and its extensions 53 and 54 are disposed may, therefore, be properly termed a motion controller for the table or support 43 and the belt 45, or the wrapper carrier and feeder. Coöperating with this motion controller is an automatic regulator for the upright 63 engaged by the cord or chain 61 to correspondingly adjust or change the position of the said upright with relation to the change of position of the table or support 43 and its standards 50 and avoid interference with the desired operation of the cord or chain 61 and prevent the least slacking of the latter during the various movements of the table and its standards with which the rotary element or pulley 65 and drum 69 necessarily are similarly moved or shifted. The regulator for the upright 63 is provided with means coöperating with the motion controller for the table or support 43 and the parts of the latter directly engaging the said motion controller to effect a timed operation between the regulator and the motion controller. The motion controller consists of a supporting member or plate 76, with an inner downwardly curved neck 77, terminating in a circular head or fulcrum 78 movable within an inclosure or boxing 79, arranged intermediately of ends of a rock-shaft 80, having an arm 81 depending therefrom and provided with a roller or other analogous means 82, continuously held in engagement with a groove 83 in a cam 84. This cam 84 is secured on a shaft 85 extending inwardly from the main driving mechanism, as shown by dotted lines in Fig. 1, and the groove 83 of said cam will be so constructed as to rock the shaft 80, at proper intervals, to effect the necessary rise and fall of the table 43 and belt 45 relatively to the variation in the vertical diameter of the bunch receiving the wrapper. This motion controller and the regulator for the upright or support 63 are clearly shown by Figs. 10 and 11 in detail, and in assembled relation by Fig. 2, and projecting outwardly and upwardly from the under side of the inclosure or box 79, is a connecting member or neck 86, secured at its free end to the under side of a pattern-plate 87, the latter having a curved slot 88 formed therein and given a longitudinal contour similar to that of the cigar to be wrapped by the machine. This pattern-plate 87 is removable and may be replaced at any time by another having a different form of slot therein, when the longitudinal contour of the cigar bunch to be wrapped by the mechanism is varied. In other words, the pattern-plate 87 used will always have the slot 88 thereof in exact duplication of the longitudinal contour of the cigar to be wrapped by the machine. Above the pattern-plate 87, the supporting member or plate 76 is formed with a longitudinal opening 89, of rectangular form and having side feathers or ribs 90 which engage corresponding grooves in the opposite side edges of a slide 91, which is movable longitudinally in the opening 89 and has a headed pin or bolt 92 projecting therethrough and through the slot 88 of the pattern-plate 87, the head of the pin or bolt being located against the under side of the said pattern-plate, and having the upper terminal of the shank thereof reduced and screw-threaded, as at 93, and passed through the inner extension 54 of the base 51 and securing the said base to the slide 91. The length of the opening 89 is materially greater than the length of the slide 91, and the latter will be proportioned, in respect to the opening, to compensate for the inward and outward movement of the base 51 and the table 43 and belt 45 held thereby, regularly in relation to the variation of the thickness of the bunch wrapped from the tuck to the tip or head end thereof. The portion of the shank of the bolt or pin 92 which passes through the slide 91 and the slot 88 of the pattern-plate 87 is smooth and free to have a slight rotation when the bed 51 shifts laterally on the support 76, by means, and for a purpose, which will be presently explained, to obviate the least obstruction to the sensitive or free movement of the base 51, as an entirety, and the slide 91. The suction or exhaust pipe 56 will be of such length as to move with the support 76 without exerting a pulling tension thereon and to establish communication with the hollow base 51. The said pipe 56 is attached to a nipple 94 depending from the outer extremity of the support 76 in line with an opening 95 over which the opening 55 in the bottom of the base 51 is in continual registration, irrespective of the lateral movement of the said base on the support 76, the opening 55 to be made long enough for this purpose.

The outer extremity or extension 53 of the base 51 has a coupling arm 96 projected therefrom and terminating in a ball 97, and the similar extremity of the support 76 has a shorter coupling arm 98 extending outwardly therefrom and also terminating in a ball 99. The balls 97 and 99 are, respectively, engaged by socket links 100 and 101, having terminal sockets which embrace the said balls at one end and at their opposite ends movably fit over balls 102 and 103 on the ends of connecting rods 104 and 105, which respectively extend back and connect with transverse shafts 106 and 107, having bearing in a portion of the frame and at their inner ends provided with cranks 108 and 109, having terminal projections engaging cam grooves 110 and 111 in a cam 112, said cam grooves being of such circumferential contour with respect to the cam as to cause proper interval operations of the rods 104 and 105 and the base 51 and supports 76 with which they are connected, through the medium of the links 100 and 101. The links 100—101, the connecting rods 104—105, and the cam grooves 110—111, engaged by the terminals of the cranks 108—109, are all so proportioned and shaped, as to the time of operation, as to regularly move or swing the support 76 in a substantially horizontal plane in a curvilinear path, through the medium of the fulcrum 78, and at the same time the base 51 is carried regularly therewith in the same curve until the difference in length between the connections therefor and the similar connections for the support 76 become effective, when the said base moves laterally on the support 76 to modify the angle of the feeding end of the table 43 with relation to the bunch to which the wrapper is being applied. This operation will regularly ensue by reason of the fact that the cam 112 is connected up to the remaining part of the driving mechanism in such manner that the several variations in the cam grooves 110 and 111 will produce the motions just set forth and also return the base and table 43, carried thereby, as well as the support 76, to normal position after the wrapper has been fully applied and fed from the belt 45. During this swinging movement of the support 76 and base 51, carrying the table 43, to cause the wrapper to be fed longitudinally with relation to the bunch, the particular curve necessary to cause an accurate follow of the feeding end of the table 43 and the belt, with respect to the bunch, will be insured by the slot 88 in the pattern-plate 87 and through the medium of the slide 91, which moves inwardly and outwardly in the opening 89, the base 51 and the table 43 thereof will be correspondingly moved inwardly and outwardly in accurate conformity to the variation in diameter of the bunch from the tuck to the tip or head end of the same. The advantage of this inward and outward movement of the table 43 and belt 45 is that the feeding end of the belt and table, adjacent to the bunch, will be at all times so close to the latter as to insure a smooth and firm application of the wrapper by instituting a uniformity of tension thereon throughout the whole length of the bunch holding and wrapper applying means. During the curvilinear movement of the support 76 and the base 51, and simultaneously with the inward and outward movement of the said base, the rock-shaft 80 operates to cause a gradual rise and fall of the support and the base to set up an angular disposition of the table 43 and its belt 45, relatively to a horizontal plane, to compensate for the variation in vertical diameter of the bunch which increases, as will readily be understood, from the tuck end toward the intermediate portion and then tapers toward the head end, this rise and fall movement of the support 76 and parts carried thereby, imparting to the table 43 and the belt 45, during the curved swing of the support in a horizontal plane, a curved path to travel over the bunch. This latter path of travel or movement is also essential in the proper automatic application of the wrapper to the bunch, as the wrapper will thus be applied around the bunch under uniform tension, especially in view of the employment of the actuator and controller 57, governing the speed or rapidity of feed of the wrapper. One of the most essential movements of the wrapper holder and feeder as disclosed by the immediately preceding description is the automatic horizontal swinging motion imparted thereto in opposite directions independent of the other motions, and such horizontal operation may be effective alone, in some instances, to regularly apply a wrapper to a bunch.

The regulator which coöperates with the upright 63, serves as a guide means for the cord or chain 61, and consists of an inwardly and outwardly, and laterally movable arm 113, having a longitudinal slot 114 in its rear extremity engaged by a pin or bolt 115, passing vertically through a combined guide and holding means 116, forming part of the frame of the machine and embracing the upper and lower sides of the slotted extremity of the arm. At an intermediate point, the arm has a depending projection 117, which extends through a longitudinal slot 118, in the neck 77, at the rear extremity of the plate 76. Through the medium of the projection 117, the regulator is swung in a horizontal plane, in a curved line conforming to the slot 88 of the pattern-plate 87, equally with the support 76, the slot 118 being long enough, and the projection 117 of such dimensions, as to permit the regulator to be drawn inwardly and outwardly with the base 51, which engages the upright 63, in a manner which will be presently set forth, without in the least obstructing or checking such movement of the base. The outer extremity of the arm 113 is projected upwardly and terminates in a depending sleeve 119, which is disposed over an inwardly extending foot 120 at the lower end of the upright 63, and through the said sleeve and foot, a screw-threaded bolt or coupling pin 121 is vertically inserted and secured by a nut 122 bearing against the under side of the said foot 120. The upright 63 is held over the inner extension 54 of the base 51, through the medium of opposite guide pins 123 projecting laterally from the foot 120 and engaging slotted ears or upstanding projections 124, integrally formed with or otherwise secured to the extension 54, the pins passing through or being disposed in the ears 124 in such position relatively to the said ears that the nut 122 will be far enough above the upper surface of the extension 54 to permit the upright 63 to have unobstructed movement and also facilitate the application of the said nut in the assemblage of the parts of the machine, or a separation of said nut in the event that removal is necessary. It will thus be seen that the regulator has movements approximately corresponding to those of the support 76 and the base 51, and the purpose of such movement is to always hold the chain or cord 61 engaged by the uprights 63 in proper alinement with the rotary element or pulley 65, irrespective of the position of the standards 50 and thereby obstruct any tendency of the cord or chain to become disengaged from the said pulley or vary the tension on the cord or chain in excess of, or less than, the normal tension desired and predetermined to institute a variable feed of the wrapper through the movement of the belt by the operation of the actuator and controller 57. In support of the immediate foregoing explanation, it will be understood that the cord 61 is always under control of the drum 65, and any slackening of the cord will be immediately taken up by a winding operation of the drum, which is spring governed in view of the shaft 66 having the spring 71 connected thereto, as clearly shown by Fig. 8 and hereinbefore referred to. It will also be understood that the pinion 60 on the end of the shaft 59 receives motion during this operation in opposite directions from the gearing, as disclosed in my pending application, Serial Number 220,920, as hereinbefore referred to. The actuator or controller is not affected as to its position by the vertical movements of the mechanism just explained and ensuing from a rocking operation set up on the shaft 80 by the arm 81, in view of the fact that the ears 124 are formed with arcuate slots, as at 124$^a$, and sufficient play is thus permitted to compensate for the vertical movements without affecting the actuator or controller above, the latter merely regularly following the horizontal swinging movement of the parts below and supporting the same, and, furthermore, the parts which immediately support the actuator and controller are not subjected to the rise and fall or vertical movements of the devices imparting such movement to the base 51 supporting the wrapper feeding mechanism. Furthermore, the cord or chain 61 is always maintained or held in taut condition between the actuator and controller 57 and the drum 65, and through the gears 67 and 68 between the drums 65 and 69 the said cord or chain is practically connected to one extremity of the feeding belt 45 and acts against the tendency of the spring winding drum 74 to always wind. Furthermore, the rise and fall of the wrapper presenting means are gradually effected and not with a sudden jerking or jar, and during such rising and falling movements the actuator and controller continues to operate as well as the drum 65, and there is no interval when the belt ceases to wind or unwind from its drum, or the chain or cord ceases to wind or unwind from the drum 65 during the operation of the wrapper presenting means or when a wrapper is being fed to a bunch held in the wrapper applying rolls.

The bunch-holding and operating mechanism, shown in dotted lines in Figs. 1 and 2, is similar to that used in my other machines, and particularly the form of said mechanism disclosed by my pending application, Sr. No. 220,920, wherein a series of rolls is separably held by movable arms and actuated in timed relation to the feed of the wrapper by mechanism coöperating with the wrapper feeding devices, and also fully brought out in my preceding applications.

In describing the movements of the wrapper carrier and feeder as an entirety, it will be understood that the inner end of the table 43 and adjacent portion of the belt 45 will always be held in close position over the bunch holding and operating rolls. Furthermore, it will be understood that after a wrapper is delivered to the belt 45 by the pick-up and transferring roller 36, the latter returns, together with the roller 34, to normal position and at a proper interval moves over the die 1 to pick up a succeeding wrapper, and at about the time that the table 43 and belt 45 have reached a normal position, after having operated to feed a wrapper, the pick-up and transferring roller will be assuming a position close to the outer end of the table 43 to dispose another wrapper on the belt, and this operation is successively and regularly carried on, through the medium of accurately timed mechanism controlling the several organizations, as shown, and which may be varied at will, but which in the main consists of the same devices set forth in my applications hereinbefore specified, with such variations as have already been enumerated, and others that will be explained in connection with the wrapper head cutting and finishing mechanism. One of the most essential advantages of this wrapper feeding mechanism is that the compensating means and actuator and controller heretofore described insures a uniform tension on the entire area of the wrapper while the latter is fed at irregular rates of speed and variable angles with respect to bunches of differing diameters. It will be understood also that the table 43 and its belt 45, together with the lower controller therefor, do not start to return to normal position until the head end of the wrapper has left the same, and when this ensues, the wrapper head cutting mechanism engages the head extremity of the wrapper a sufficient length of time prior to the release of the wrapper from the wrapper feeding mechanism to insure a practical operation by said cutting mechanism with respect to the portion of the wrapper to be patterned, as will be more fully hereinafter specified.

It is considered that the tension exerted on the wrapper as it is fed by the belt 45 to the bunch, will be sufficient, under ordinary conditions, to cause the wrapper to evenly and firmly envelop the bunch without the use of other mechanism, and at times no other mechanism will be used. In the present machine, however, an efficient auxiliary wrapper controlling and applying mechanism is shown by Figs. 1, 24, 25, and 26, and is independently operative, or may be used in conjunction with the wrapper carrier and feeding mechanism just described. This auxiliary mechanism consists of a longitudinally sliding bar 125 disposed in an inclosing guide 126 and having a depending projection 127 at its outer end with a roller 128 thereon adapted to be engaged by a cam enlargement 129 on the outer face of a cam wheel 130 forming part of the main operating mechanism of the machine. When it is desired to dispense with the operation of this auxiliary mechanism, it may be disconnected from the cam wheel. Furthermore, in the event of manual feed of the wrapper directly to the applying mechanism shown, or other mechanism adapted for the purpose, this auxiliary mechanism can be employed to guide and control the wrapper with respect to the bunch. The bar 125 has a longitudinal slot 131 opening out through the bottom thereof and arranged intermediately of the ends thereof, and between one end wall of this slot and a stop or projection 132 extending upwardly within the box or guide inclosure 126, a spring 133 is interposed and operates to throw the bar inwardly into a normal position when the roller 128 has become released from the cam enlargement 129 and thereby restore the device carried by the bar having direct engagement with the wrapper, to a normal position. The inner end of the bar 125 has a lateral projection or ear 134 to which one end of a link 135 is movably attached, the opposite end of said link being pivotally attached to an outwardly projecting arm 136 secured to or integrally formed with a rotating head 137 fulcrumed on a post 138, rising from a plate or support 139 connected to the inclosing guide 126, and also constituting a part of the frame, the said post 138 having a lower shoulder 140 to sustain the head at a proper elevation with relation to the frame and to insure a positive disposition of the wrapper contact or controlling head forming part of the auxiliary mechanism and which will be more fully hereinafter set forth. The inclosing guide 126 is held at a proper elevation by a standard or analogous device 141 connecting with one end of the guide, to raise the plate or support 139 high enough to dispose the controlling head in such position that it will engage the wrapper when the latter is being applied to the thickest part of the bunch. Secured on the upper surface of the support 139, in coöperative relation to the head 137 is a downwardly curved track 142, which is also arcuate with respect to a vertical axis, as clearly shown by Fig. 1, the said track projecting beyond the end of the support 139, as clearly illustrated by Fig. 24. The inner free extremity of the head 137 is formed with a longitudinal slot 143 which opens upwardly through the top of said head and also through the inner end, and in the said slot the outer terminal of an arm 144 is pivotally secured and free to have movement in opposite vertical directions. This arm 144 carries a roller 145 which is continuously held in contact with the track 142 by the weight of the arm. The positive gravitation of the arm 144 with respect to the track 142 is increased by a hollow wrapper contacting or controlling head 146 carried by the free end of said arm and provided with a perforate bottom 147 continued into a convex side 148, which is also perforated. Connecting with the top of this head is a coupling nipple 149 of suitable shape and construction to receive a suction pipe 150, which leads away to the common suction creating means for the machine, practically the same suction or exhaust force being exerted through the head as through the belt 45, die 1, and pick up and transferring roller 36. As shown by Fig. 1, the normal position of the head 146 of the auxiliary wrapper controlling mechanism is close to the delivery end of the table 43, and at a proper time, the cam enlargement 129 strikes the roller 128 and the bar 125 is gradually drawn outwardly against the resistance of the spring 133, and through the link 135 the arm 144 is swung over in the arc of a circle through the medium of the connection between the said link 135 and the head 137 and the head 146 rests against the wrapper and institutes a following pressure or drawing tension on the wrapper as it is applied, and prevents slackness of the wrapper in application to the bunch along such portion of the latter where a looseness might have a tendency to occur, the decrease in diameter of the bunch to which the wrapper is applied being compensated for by the gravitation of the arm 144 over the track 142. When the auxiliary mechanism is used independently of wrapper feeding mechanism, as hereinbefore indicated, it can be arranged to travel the whole length of a bunch while the wrapper is manually fed to the bunch. This auxiliary controlling mechanism serves as an additional means, in coöperation or when used with the wrapper feeding mechanism to insure a perfect joint between the overlapping edge portions of the wrapper and a snug or tight application of such wrapper as well as a smooth or finished surface to the cigar. After the head 146 has reached the limit of its movement toward the tip or head end of the cigar and which will be determined by the shape of the cam enlargement 129, the roller 128 is released from such cam enlargement and the spring 133 being then free to act quickly throws the bar 125 outwardly and restores the arm 144 and head 146 to the normal position shown by Fig. 24. This auxiliary wrapper controlling mechanism completes all the devices which relate to feeding and applying a wrapper, and the head cutting, or patterning mechanism will now be described.

Adjacent to the position of the head end engaging extremities of the bunch holding rolls, the head cutting and patterning or forming mechanism is located and is carried by a supplemental frame 151 disposed at an upward angle of inclination transversely of the machine, as shown by Fig. 1, and secured to a shank or supporting bar 152 extending outwardly into a box or guide inclosure 153 at one end of the machine and having a set screw or other analogous binding device 154. The shank 152 has a shaft 154$^a$ projecting therethrough and provided with an outer elongated square or other angular extremity 155 movable through a pinion 156 held between opposite retaining boxes or guards 157, the pinion 156 meshing with a gear wheel 158 and regularly operating the shaft 154$^a$ which constitutes the driving means for the head cutting and patterning, or completing mechanism. The shaft 154$^a$ is free to rotate in the shank 152 and will be held against longitudinal movement in said shank by suitable means, the adjustment of the mechanism being accomplished by loosening the set screw 154, and after adjustment is made the said set screw is again tightened against the shank. When the shank 152 having therein the shaft 154$^a$ is adjusted the frame 151 and the mechanism carried thereby is bodily shifted with the shank to accommodate cigars of different lengths, and during such shifting movement, the pinion 156 remains in stationary position with respect to its gear 158. The shaft 154$^a$ is connected to a combined double cam disk and double bevel gear 159, also having peripheral teeth 160. The combined disk and gear 159 together with its shaft 154$^a$ may be properly termed a movement controller for the rotary cutters and the clipper, forming the salient features of the head forming and completing mechanism, and said combined disk and gear has a substantially elliptical cam groove 161 in the outer face thereof engaged by a roller or analogous projection 162 carried by or secured to a slide 163, having an intermediate longitudinal slot 164 through which the hub for the combined disk and gear 159 and the shaft 154$^a$ extend. The frame 151 is so shaped as to accommodate all the parts of the mechanism for changing and regulating the variable movements of the rotary cutters and clipper and to steady the operation of the slide 163, the latter has bearing in the ends of the portion of the frame in which it is located. The inner face of the combined cam disk and gear 159 is formed with a central irregular groove 165 and also with an outer rim 166 of bevel gear teeth and an inner rim 167 of similar teeth, see Fig. 13. At a suitable distance inwardly from the inner face of the combined cam disk and gear 159 bevel pinions 168 and 169 are held in the opposite extremities of the frame 151 and said gears, respectively, have formed with or connected thereto opposing tubular extensions or sleeves 170 and 171 projected through bearings 172 forming part of the inner side of the frame, the inner ends of the sleeves 170 and 171 being constructed with ratchet teeth 173. From the foregoing it will be seen that the sleeves 170 and 171 of the respective pinions 168 and 169 form clutch members adapted to be alternately thrown into rotative engagement with a shaft 174 which loosely extends through the pinions 168 and 169 and their clutch members. The shaft 174 also movably projects through the opposite extremities of the frame 151 and rotatably continues through an angular bearing or shifting projection 175 of the slide 163. The shaft 174 is formed with an elongated groove 176 and between the clutch members of the pinions 168 and 169, a sleeve 177 is slidably held on the shaft but is fastened thereto for rotation therewith by means of pins or other analogous projections 178 extending therefrom into the groove 176. The ends of the sleeve 177 are formed with teeth 179 to constitute the said sleeve as a double shiftable clutch member or element adapted to engage with either of the clutch members coöperating with or forming part of the pinions 168 and 169, and the said sleeve 177 is moved longitudinally with relation to the shaft 174 by a shifting member 180 surrounding the same and securely fastened thereto, but within which the said sleeve 177 is free to rotate. This shifting member 180 is also in the form of a sleeve and has a lateral projection 181 at one end carrying a roller 182 engaging the cam groove 165, the latter being so shaped as to move the member 180 and sleeve 177 longitudinally on the shaft 174 at a proper time to change the direction of movement of the shaft as will be more fully hereinafter explained. The member 180 is also provided with a spline 183 which engages a guide groove 184 formed in the inner adjacent portion of the frame, see Fig. 14, the spline 183 and groove 184 preventing the shifting member from rotating with the sleeve 177 and thus always maintain the projection 181 and its roller 182 in proper relation to the cam groove 165. The shaft 174 is movable in consonance with the movement of the slide 163, through the operation of the cam groove 161 and the projection 162 secured to the slide, but the operation of the sleeve 177 or the longitudinal shifting movement thereof on the said shaft will be more rapidly effected than the movement of the slide 163 in view of the particular shape of the cam groove 165 with which the projection 181 of the shifting member 180 coöperates. This provision for variation in the movement of the parts just specified, is made to cause the direction of the rotation of the shaft 174 to be quickly changed or reversed for reasons which will be more fully hereinafter set forth.

Secured on the shaft 174 adjacent to the shifting projection 175 through which the said shaft extends, and between the projection and the adjacent end of the frame 151, is a bevel pinion 185 and on the upper extremity of the said shaft is secured another bevel pinion 186. Beyond or above the shifting projection 175 the shaft extends through a bearing extension 187 which forms a part of the said projection. The bearing 187 has an upper off-set projection 188 as shown by Fig. 15 which projects beyond the terminal thereof and has an inner extension 189 to provide a bearing for a lower rotary cutter 190 to which is fixed a bevel pinion 191, always held in mesh with the pinion 186, the off-set being so shaped as to permit of rotary movement of the pinion 186 and a compact arrangement of both the latter pinion and the pinion 191 and cutter 190. This cutter is in the form of a true disk without flanges or projections and coöperates with a companion device, which will be hereinafter more clearly specified. The shifting projection 175 also has a neck 192 laterally disposed thereon and extended beyond the bearing 187 and off-set projection 188, the inner edge 193 of the neck being of arcuate contour to form a clearing space between the same and bearing 187. At its outer edge the neck 192 has a tubular bearing 194, which in view of the position of the neck is disposed at an angle to the bearing 187 and the shaft 174. In this bearing 194, a short motion transferring shaft 195 is rotatably mounted and has fixed to opposite ends thereof bevel pinions 197 and 196, the pinion 197 continually meshing with the pinion 185 of the shaft 184 and to accomplish this assemblage, the bearing 194 is extended below the shifting projection 175 a sufficient distance to bring the bevel pinion 196 into contact with the pinion 185. On the upper terminal of the neck 192, a tubular bearing 198 is located and arranged at an angle to both bearings 194 and 187 and therein is rotatably mounted a short counter-shaft 199, carrying at its opposite ends bevel pinions 200 and 201, the pinion 200 being held in continual mesh with the similar pinion 197 on the upper end of the motion transferring shaft 195. The bearing 198 is formed with an off-set projection 202 similar to the off set projection 188 of the bearing 187, and also provided with an extension 203 to serve as a support for a rotary cutter 204 having a bevel pinion 205 fast thereto or forming a part thereof, and meshing at all times with the pinion 201. The rotary cutter 204 has a cutting flange 206 which at all times closely projects over the adjacent face of the rotary cutter 190, to insure a shearing operation with respect to the head extremity of the wrapper to produce the necessary preliminary cut or slit in the operation of forming the double cone head shown by Fig. 23 and which will be more fully hereinafter set forth. By positioning the shafts 194 and 199 in the manner set forth, the proper direction of motion is imparted to the rotary cutter 204 from the shaft 174, and though the slide 163 is moved longitudinally, the rotary cutters 190 and 204 always remain in the same relative position or are invariable as to the space between them after they have been assembled. Furthermore, a sufficient space is left between the peripheries of the body parts of the rotary cutters to avoid injury to the wrapper extremity which passes therebetween, but the engagement of the wrapper with the cutter bodies will be firm enough to prevent slipping of the wrapper extremity and render the desired cutting operation of the latter effective, and this operation is positively pursued by surrounding the peripheries of the body parts of the rotary cutters with rubber or other analogous bands or strips 205ª, or by employing any other friction means in connection with the cutters. The drawing of the wrapper by the rubber or other frictionally covered rollers or cutters just described, prevents the wrapper from slipping in front of the clipper or transversely severing means, and bunching or crumpling of the wrapper at any point is prevented. To prevent the portion of the wrapper passing between the rotary cutters from becoming entangled or injured by the adjacent bevel pinions and also to hold up the wrapper extremity engaged by the cutters during the cutting or preliminary preparation of the wrapper, a guard 207 surrounds each set of pinions, as shown by Fig. 15, said guards being so shaped as not to interfere with the movement of the wrapper extremity between the cutters. The guards are terminally secured to the opposite portions of the off-set projections 188 and 202 of the respective bearings 194 and 198 and consist of suitable resilient sheet metal or other material adapted for the purpose.

The combined cam disk and gear 159 imparts motion through the teeth 160 thereof to a combined gear and cam disk 208, held in the upper portion of the frame 151 and having peripheral teeth 209 meshing with the said teeth 160. The portion of the frame wherein the combined gear and cam disk 208 is mounted has a projecting member 210 which serves as a positive means for establishing a bearing for the said combined gear and disk and between which and the opposite side portion of the frame the said gear and disk is disposed. The position of the combined cam disks and gears 159 and 208 is clearly shown by Fig. 12, and the cam disk and gear 208 is employed to operate the clipper 211, and for this purpose is provided, in its inner side, with a cam groove 212, with two deflections 213 and 214 in close relation, the remaining part of the groove being concentric with the axis of the combined gear and disk 208. The cam groove 212, with its deflections, as specified, controls the cutting action of the clipper, and within the confines of the groove 212, the combined gear and disk 208 is formed with a second cam groove 215 having a single irregular deflection 216 to control the elevation of the clipper. The clipper embodies in its organization a bell-crank arm 217, which is fulcrumed on the frame 151 adjacent to the combined gear and disk 208 and has a downwardly deflected short member 218 with a terminal projection or roller 218ª engaging the cam groove 216, the longer member of the said bell-crank arm being projected inwardly and terminally holding shear-like clipper blades 219, which are pivotally applied to the bell-crank arm and have reversely extending outwardly inclined shanks 220. The blades 219 are normally open and are vertically movable close to the rotary cutters 190 and 204 and between the latter and the head end of the cigar bunch held disposed in the bunch holding rollers. To the lower terminals of the shanks 220, links 221 are pivotally connected and converge toward and are pivoted to the inner end of an actuating lever 222, which projects outwardly and is fulcrumed against the side of the frame 151 below the fulcrum point of the bell-crank arm 217, the fulcrum of the actuating lever 222 being at a distance inward from the outer free end of said lever, which carries a suitable projection 222ª provided with a roller or other anti-frictional device which is always held in engagement with the cam groove 212.

The operation of this header mechanism including the rotary cutters and clipper and actuating devices, is as follows:—When the entire machine is set in motion, the slide 163 moves upwardly a proper interval through the operation of the combined gear and cam disk 159 and therewith the shaft 174 is also moved by the upper end of the bearing 187 engaging the part of the bevel gear 186 secured on said shaft, and simultaneously the shifting member 180 will move upwardly through the operation of the cam groove 165 and carry therewith the sleeve 177 until the teeth at the proper terminal of said sleeve are in mesh with the clutch member of the upper pinion 169 and cause the shaft to rotate in the direction of the arrow 223. Motion will be imparted to the shaft through the pinion 169 by the inner bevel teeth 167 on the combined gear and cam disk 159, and through the pinions and shafts heretofore explained, the rotary cutters will be caused to rotate inwardly, as indicated by the arrows in Figs. 2 and 17, in a proper direction over the head or tip extremity of the wrapper being applied to the bunch, and while said extremity is still engaged by the wrapper feeding mechanism, the position of the cutters being such, with respect to the head end of the bunch, that the head end of the wrapper then positioned at an angle will, with certainty, pass between and in contact with the cutters to form the slit shown by Fig. 18. As before set forth, the cutters will hold up and properly tension the wrapper extremity after the latter is liberated from the feeding mechanism, or if the wrapper be hand fed, said cutters will similarly operate. It will be understood that the rotary cutters are raised to the position shown by Fig. 17 and close to the head end of the partially wrapped bunch, at the proper moment and when the head end of the wrapper has such angular position with respect to the cutters as to induce an accurate engagement of the said wrapper extremity by the cutters. During the time that the initial slit is being formed in the head end of the wrapper by the rotary cutters 190 and 204, the latter will have a speed of rotation equal to that of the bunch to maintain a regularity of tension on and avoid obstructing in the least the operation of applying the wrapper by a drag or variation in the operation of the rotary cutters, and also to prevent slitting the wrapper at an improper point. This regularity and unity of operation between the bunch and the rotary cutters will be preserved by properly arranged and timed gearing or other operating elements. While this initial slit is being made, the outside part of the wrapper extremity is carried by the cutters and held at the same tension as the inner part of said extremity to avoid injury to the wrapper and any tendency to gathering of the latter on the bunch. After the initial slit has been made in the head end of the wrapper, it is necessary that the rotary cutters clear themselves from the wrapper, and just about the time that the said slit is completed, the cam groove 165 through the shape thereof, clearly shown by Fig. 2, will have arrived in such position with respect to the projection 181 as to throw the shifting member 180 downwardly over the shaft 174 and cause the lower toothed end thereof to engage or couple with the clutch member 173 of the pinion 168, which is always held in mesh with the outer rim 166 of bevel teeth, and at the same time the cam groove 161 will operate on the projection 162 to slowly but regularly move the slide 163 downwardly and pull the shaft 174 in the same direction, through the medium of the shifting projection 175 striking against the pinion 185. When the sleeve 177 is connected to the clutch member of the pinion 169, the pinion 168 runs loose on the shaft 174, and conversely when the said sleeve is coupled to the clutch member of the pinion 168, the pinion 169 runs loose on the shaft 174. When the pinion 169 is coupled to the shaft 174, through the sleeve 177, the motion of the shaft is somewhat slower than when the pinion 168 is coupled to said shaft by the sleeve and the purpose of this difference in speed of the shaft is to insure a run-off or clearance of the rotary cutters from the projecting or head end of the wrapper while the latter is being continuously applied to the bunch, the said bunch having a regular or invariable speed of rotation at such time and similar to that when the cutters form the initial slit, as shown by Fig. 18. This run off or clearance of the cutters from the wrapper extremity ensues without the least diminution in the required tension on the said extremity. By coupling the pinion 168 to the shaft 174, and by reason of the said pinion engaging the bevel teeth 166, which are located outside of the teeth 167, this increase in speed of rotation of the shaft 174 is accomplished, and the direction of movement of the said shaft will be that indicated by the arrow 224, thereby reversing the direction of rotation of the rotary cutters 190 and 204, as clearly shown by Fig. 19, the said cutters in this second position then operating to hold up the free end of the wrapper and exert a pulling tension thereon to insure a proper application and assist an initial clipping operation, which will now be described. Just as the rotary cutters complete the initial slit, shown by Fig. 18, the combined gear and cam disk 208 will have been revolved to such a point that the projection of the shorter member 218 of the bell-crank arm 217 engages the deflection 216 of the cam groove 215. The clipper 211 will be raised in open condition, and when the clipper blades have partially projected over the loose extremity of the wrapper close to the head end of the cigar, the deflection 214 of the cam groove 212 will be in position for engagement by the projection on the inner end of the actuating lever 222 and cause the latter to draw downwardly on the links 221 and through the shanks 220 of the blades 219, close the said blades and form a short angular slit at the inner end of the initial slit, as illustrated by Fig. 20, the free extremity or head end of the wrapper being held, during such operation, in proper position and under tension by the rotary cutters 190 and 204. The clipper, after forming the angular slit set forth, remains in elevated position and the blades thereof are thrown open by the interval between the cam groove deflections 214 and 213, such interval being practically in line with the main part of the groove 212. During this open elevated position of the clipper, the head extremity of the wrapper will have continued to be applied by the rotation of the bunch, and after a short interval, or a momentary inaction of the clipper, the deflection 213 of the cam groove 212 in the combined gear and cam disk 208 will be engaged by the projection on the end of the actuating lever 222 and at the same time the clipper will be fully raised so that the blades extend over the free terminal of the wrapper and said blades will then be closed and sever the surplus extremity of the wrapper, as shown by Fig. 21, to complete the formation of the head end of the wrapper, as clearly shown by Fig. 22, the bunch being continuously rotated and the head completed or finished to produce a double cone construction, as clearly shown by Fig. 23. Just as the clipper completes this final cut, the rotary cutters will clear the extremity of the wrapper and the loose pieces will fall away from said cutters. After the clipper has finally operated to sever the surplus extremity of the wrapper, the cam grooves 212 and 215, coöperating respectively with the actuating lever 222 and the bell-crank arm 217, will effect an immediate opening of the blades 219 and a lowering movement of the clipper as an entirety to normal position, and immediately thereafter the rotary cutters will resume their normal position, as hereinbefore indicated. This operation will be carried on similarly with succeeding wrapper extremities, and during the finishing of the head end of the cigar, the wrapper cut in the manner hereinbefore specified will be mechanically supplied with paste or any suitable adhesive material through a flexible tube 225, running from a reservoir 226ᵇ which will be described more fully hereinafter. The rotary cutters, through the flexible contact or friction surfaces entirely control the head end of the wrapper after the latter has been released from the feeding mechanism, and they completely guide, control, and feed the head end of the wrapper, during the making of the pattern for the head and while being applied to the head end of the bunch and until the clipper makes it final cut. The mechanism as set forth for patterning and finishing the head end of a wrapper and a cigar is only one form of a practical organization for arriving at this result. The essential feature involved in this head forming or completing mechanism, is properly holding, tensioning and patterning the end of a wrapper, which is adapted to be applied to the head end of the cigar, subsequent to the preparation of said extremity for completing the said wrapper head end, and without requiring any cessation of the rotation of the bunch during the operation of the said means.

A further step in the completion of the cigar consists in smoothing, finishing or dressing the head end of the wrapper with respect to the bunch to insure a complete adherence of the wrapper at such point. This is accomplished through the medium of mechanism, which primarily embodies means simulating the fingers of the human hand, or what may be properly termed, mechanical fingers having a yielding pressure corrresponding to that of the human fingers. For this purpose, a slide rod 226, movable in a guide 227 against the resistance of a spring 228, is employed, the end of the rod projecting outwardly or beyond the end of the frame of the machine adjacent to the head forming and completing mechanism just described and having thereon, close to the said frame end, a grooved wheel or pulley 229, which is held in place by an angle-arm 230 through which the rod also projects. The inner end of the slide rod 226 is formed with radiating, smoothing, or polishing fingers 231, which may be composed of rubber, metal, or a composition of materials having an operation similar to the pressure instituted in completing a hand-made cigar. The rod 226 is given a longitudinal movement toward the head end of the cigar just at the moment that the wrapper extremity, with the head formation, as hereinbefore described, has been completed, and this longitudinal movement is inward toward the end of the cigar and the rotation is in a direction to effect an additional securement of the said head end of the wrapper on the corresponding portion of the bunch, the rod being given a proper rotation in its advance toward the head end of the cigar previous to the engagement of the fingers of the fork 231 with said end of the cigar. When the fingers of the fork 23 are withdrawn from the cigar, the same direction of rotation thereof is continued to avoid releasing or loosening the wrapper from the bunch. This inward movement of the rod is accomplished through the medium of a lever 232, pivotally held at an intermediate point, in an outwardly projecting bracket-arm 233, and having its opposite end provided with a roller 234, engaging a cam groove 235 in one of the main operating cams 236, which carries the gear 158. The pulley 229 is surrounded by a belt 237, which also engages a suitable groove 238 on the cam 236 and through the medium of this belt and pulley, a rotary movement is imparted to the rod 226. The cam groove 235 has such shape that it first operates the lever 232 to press the rod 226 inwardly against the resistance of the spring 228 and holds the fork 231 long enough in engagement with the head end of the cigar to additionally finish such end, and at the end of the time of the inward projection of the rod, the cam groove will have a deflected portion thereof directly opposite the end of the lever 232 carrying the roller 234 to free the said arm and permit the spring 228 to operate to automatically throw the rod outwardly. This construction of finishing device, may have the fingers of the fork 231 yielding to engage the cigar head with variable pressure simulating the pressure of the fingers of the human hand.

As clearly shown by Fig. 27, the paste reservoir 226$^b$ in the present instance, is provided with a weight 226$^a$ to regularly force the paste from said reservoir outwardly through the feeding means or pipe 225 leading to the head extremity of the wrapper applying mechanism. This weight will be readily removable from the reservoir and will have such dimensions as to practically perform the operation of a forced feed with respect to the paste. This weight attachment will overcome any tendency of sluggishness in the feed of the paste.

By the use of the actuator and controller, as heretofore set forth, the feed of the wrapper is so regulated that it is impossible to break or tear a wrapper while being applied to a bunch, and the bunch cannot drag the wrapper off its support and holding or feeding devices, nor can it move it or otherwise disturb it as it feeds exactly or regularly while the bunch is taking it.

Having thus fully described my invention, what I claim and desire to secure by Letters Patent is:—

1. In a cigar making machine, a movable wrapper holding and feeding means having a movable element directly engaged by the wrapper to project the latter from said means, wrapping mechanism, and mechanism for imparting angular and inward and outward movements to said holding and feeding means to dispose the same in different positions relatively to the wrapping mechanism to accommodate variations in the diameter and contour of a bunch to which the wrapper is applied, the wrapper holding and feeding means simultaneously moving longitudinally with respect to the wrapping mechanism.

2. A movable cigar wrapper holding and feeding means having a movable element directly engaged by the wrapper to project the latter from the said means with a continuous movement, wrapper applying mechanism with which the said holding and feeding means coöperate, and mechanism for imparting a curved swing and inward and outward lateral movements to the feeding means relatively to the wrapper applying mechanism.

3. A movable cigar wrapper holding and feeding means, wrapper applying mechanism, and mechanism for imparting a horizontal curvilinear swing and vertical and inward and outward movements to said means with respect to the bunch in the wrapper applying mechanism.

4. A movable cigar wrapper holding and feeding means, wrapper applying mechanism, and mechanism for imparting to the feeding means a swinging movement in a curved path and a rise and fall during said swinging movement, and also an inward and outward movement with respect to the bunch in the wrapper applying mechanism.

5. A movable cigar wrapper holding and feeding means having a shiftable element for directly receiving the wrapper and operating to continuously move the latter and provided with suction means for holding the wrapper taut thereon, wrapper applying mechanism, and mechanism for imparting to the feeding means a swinging horizontal movement in a curved path, a vertical movement, and inward and outward and lateral movements with respect to the bunch in the wrapper applying mechanism.

6. A movable cigar wrapper holding and feeding means embodying a shiftable element for directly receiving the wrapper and imparting a continuous movement to the latter independent of other movements of the feeding means and provided with suction means for holding the wrapper taut thereon, wrapper applying mechanism, wrappers being fed to the wrapper applying mechanism without pulling tension on the wrappers by the said mechanism, and mechanism for causing the inner extremity of the feeding means to shift regularly lengthwise of the bunch held by the wrapper applying mechanism and also for varying the angle of the feeding means relatively to said bunch to compensate for the taper at opposite extremities of the bunch.

7. A movable cigar wrapper holder and feeder provided with suction means for holding the wrapper taut thereon, wrapper applying mechanism, the wrapper being regularly released by the holder and feeder and suction means of the latter when delivered to the wrapper applying mechanism to avoid pulling tension on the wrapper by said mechanism, and mechanism for shifting the holder and feeder longitudinally of the wrapper applying mechanism and also to automatically move the holder and feeder at an angle relatively to the taper of the bunch on opposite sides of the intermediate maximum diameter of said bunch.

8. A movable cigar wrapper holding and feeding means, wrapper applying mechanism, and mechanism for swinging the holding and feeding means in opposite directions and moving it inwardly and outwardly during the swinging operation relatively to the wrapper applying means.

9. A movable cigar wrapper holder and feeder, having a base, a support having a swinging movement in curvilinear line in opposite directions and also a vertical movement, wrapper applying mechanism, and means for causing the base to shift longitudinally on the support and for operating the latter relatively to the wrapper applying mechanism.

10. A movable cigar wrapper holding and feeding means, a support on which the said feeding means is longitudinally slidable and laterally movable, wrapper applying mechanism, and mechanism for imparting to the support a curvilinear movement and a simultaneous rise and fall relatively to the wrapper applying mechanism.

11. A movable cigar wrapper holder and feeder having a base, a support having a slide therein to which the base is connected, the support being movable horizontally in a curvilinear line and also movable vertically in opposite directions, and means for operating the holder and feeder with its base and support with its slide.

12. A movable cigar wrapper holder and feeder having a base, a support on which the base is slidably disposed, means connected to one end of the support for vertically rocking the same at intervals, and mechanism attached to the support and base for horizontally swinging the former and sliding the latter.

13. A movable cigar wrapper holder and feeder having a base, a support having a slide longitudinally movable therein and connected to a slotted pattern member, the slide being also attached to the base, and means for shifting the base on the support and moving the latter horizontally in a curvilinear path.

14. A movable cigar wrapper holder and feeder, having a base, a support having a slide longitudinally movable therein and connected to a slotted pattern member, the slide being also attached to the base, and means for shifting the base on the support and moving the latter horizontally in a curvilinear path and also vertically in opposite directions.

15. A movable cigar wrapper holder and feeder having a base, a support on which the base is pivotally and slidably disposed, means for rocking the support in opposite vertical directions and for swinging the same horizontally in a curvilinear path simultaneously with the rocking movement thereof, and means for operating the base to change the position of the holder and feeder.

16. A movable cigar wrapper holder and feeder having a base with a projection, and a motion controller on which the base is shiftably mounted, the said motion controller having a slotted pattern plate through which the projecting device of the base extends and also provided with means for imparting to the base and parts carried thereby a horizontal swinging movement and a vertical rise and fall.

17. A movable cigar wrapper holder and feeder having a base, a support having a horizontal swinging and rise and fall movements imparted thereto, means connected to the inner terminal of the base for pivoting the latter to the support, and mechanism connected to the outer end of the base for adjusting the said base on the support.

18. A movable cigar wrapper holder and feeder having a base, a support for the base, said support having a longitudinal slide and a slotted pattern plate, a pivot element depending from the base and rotatable in the slide and shiftable in the pattern plate, and means for imparting horizontal swinging and rise and fall movements to the support.

19. A movable cigar wrapper holder and feeder having a base, a support on which the base is movably mounted, the inner terminal of the support having a fulcrum and a rock shaft coöperating therewith to tilt the same, and mechanism for actuating the rock shaft and also for moving the support in opposite horizontal directions.

20. A movable cigar wrapper holder and feeder having a base, a support on which the base is shiftably mounted and provided with a removable pattern plate with a slot extending longitudinally thereof conforming in contour to the longitudinal curvature of the cigar bunch to be wrapped, a depending device secured to the base and movable in the said slot of the pattern plate, and mechanism for moving the base on the support and shifting the latter horizontally in opposite directions.

21. A movable cigar wrapper holder and feeder having a base, a support on which the base is shiftably mounted and provided with an inner neck having a terminal fulcrum device, an inclosure for the fulcrum device, a rock shaft connected to the inclosure, means for operating the rock shaft, and ball and socket devices connected to the outer extremities of the base and support, and also to mechanism for operating the support and the base.

22. In a cigar machine, a cigar wrapper holder and feeder having a base and a movable belt, a support on which the base is shiftable, the said support having imparted thereto horizontal swinging movement in opposite directions and a simultaneous rise and fall, an actuator and controller having a flexible connection coöperating with the belt, a compensator movably held on the base and engaged by the said flexible connection, and a regulator connected to the compensator and having means extending into a portion of the support.

23. In a cigar machine, a cigar wrapper holder and feeder having a movable belt, a support on which the holder and belt are shiftably mounted, a fulcrumed compensator on the support, an actuator and controller simulating in shape the bunch to be wrapped and having a flexible connection between the same and the belt, said connection being movable over the compensator, and a regulator connected to the compensator and having means for operation thereof by the support, the latter being movable horizontally in opposite directions.

24. In a cigar making machine, wrapper applying mechanism, a movable cigar wrapper holder and feeder having a supporting means slidable inwardly and outwardly, shiftable laterally, and also having rising and falling movements, a compensator fulcrumed on the supporting means to regulate the feed of the wrapper, an actuator and controller having a flexible connection passing over the compensator and coöperating with the feeder, and mechanism for causing the compensator and flexible connection to change in position in accordance with the change of position of the feeder and its supporting means.

25. In a cigar making machine, a movable cigar wrapper holder and feeder having supporting means arranged to slide inwardly and outwardly, shift laterally, and rise and fall, to change the angle of the feeder, a compensator fulcrumed on the said means to regulate the feed of the wrapper, an actuator and controller having a flexible connection passing over the compensator and coöperating with the feeder, and mechanism for causing the compensator and flexible connection to be changed in position in accordance with the position of the feeder and its supporting means.

26. In a cigar making machine, a movable cigar wrapper holder and feeder having a belt coöperating with winding means to move it in opposite directions, a supporting means shiftable horizontally in opposite directions and also having a rise and fall imparted thereto, a fulcrumed compensator automatically movable to regularly conform to the change of position of the supporting means for the wrapper holder and feeder to regulate the feed of the wrapper, a winding mechanism carried by the supporting means and coöperating with the winding means for the belt, an actuator and controller simulating the shape of the bunch to which the wrapper is to be applied, and a flexible connection between the actuator and controller and the winding mechanism, said flexible connection engaging the compensator and always held by the latter in proper relation to the said winding mechanism.

27. In a cigar making machine, a movable cigar wrapper holder and feeder having a belt coöperating with winding means to move it in opposite directions and a supporting means, a rotary winding element held by said supporting means and geared to the belt winding means, a support on which the supporting means is movable inwardly, outwardly and laterally, said support having a slot in the rear portion thereof, and mechanism for imparting a swinging movement horizontally in opposite directions and also vertically thereto, a fulcrumed compensator to regulate the feed of the wrapper, a regulator movable in opposite directions horizontally and connected to the compensator and also having a projection extending into the slot of the support, an actuator and controller simulating in shape the contour of the bunch to which the wrapper is to be applied, and a flexible connection movably engaging the compensator and secured to the actuator and controller and the rotary winding element.

28. In a cigar making machine, a movable cigar wrapper holder and feeder having a supporting means and automatically shiftable horizontally in opposite directions and at an angle relatively to a true longitudinal movement, means for controlling the direction of movement of the feeder, a fulcrumed compensator movable to accommodate the change of position of the feeder to regulate the feeder of the wrapper, an actuator and controller simulating in shape the contour of the bunch to which the wrapper is to be applied, and a flexible connection freely movable over the compensator and terminally attached to the actuator and controller and also coöperating with the feeder.

29. In a cigar making machine, a cigar wrapper holder and feeder having universal movement with respect to the bunch to which the wrapper is to be applied, a compensator to regulate the feed of the wrapper, an actuator and controller simulating in shape the contour of the bunch to which the wrapper is to be applied, and a flexible connection movably passing over the compensator and secured at one end to the actuator and controller and coöperating at the opposite extremity with the feeder to cause the latter to move in unison with the operation of the actuator and controller.

30. In a cigar making machine, a wrapper holder and feeder having universal movement with respect to the bunch to which the wrapper is to be applied and provided with a base or supporting means, a fulcrumed compensator having its lower terminal held above the supporting means, an actuator and controller simulating in shape the contour of the bunch to which the wrapper is to be applied, the compensator regulating the feed of the wrapper and having movement similar to and in consonance with the holder and feeder, and a flexible connection movably engaging the compensator and secured to the actuator and controller at one end and coöperating with the holder and feeder at the opposite end.

31. In a cigar making machine, the combination of a wrapper holder and feeder consisting of a table having a belt movable thereover and standards rising from a supporting means, a winding drum held between the standards with which one end of the belt connects, a spring controller having the opposite end of the belt attached thereto and in gear with the said drum, a rotating element below the drum and geared to the latter, a motion controller on which the supporting means of the wrapper holder and feeder is slidable inwardly and outwardly and also laterally, the motion controller being movable in opposite directions horizontally and also vertically at intervals, a compensator to regulate the feed of the wrapper, a regulator fulcrumed at its rear extremity to move horizontally in opposite directions and connected to the compensator and also provided with a projection engaging the motion controller, an actuator and controller having a rotary movement imparted thereto at intervals and simulating in shape the contour of the bunch to which the wrapper is to be applied, and a flexible connection movably engaging the compensator and connected at its opposite terminals, respectively, to the actuator and controller and the said rotating element.

32. In a cigar making machine, a wrapper feeder and holder including a table having a belt movable thereover and supporting means, the wrapper holder and feeder having a universal movement imparted thereto with respect to the bunch to which the wrapper is to be applied, a winding drum held by the supporting means and having one end of the belt secured thereto, a spring controller in gear with the winding drum and having the opposite end of the belt connected thereto, a spring actuated rotary element below and geared to the drum, a fulcrumed compensator automatically movable in consonance with the change of position of the wrapper holder and feeder to regulate the feed of the wrapper, an actuator and controller having a rotary movement imparted thereto at intervals and simulating in shape the contour of the bunch to which the wrapper is to be applied, and a flexible connection engaging the compensator and terminally attached respectively to the actuator and controller and the said rotary element.

33. In a cigar making machine, a wrapper holder and feeder having universal movement with respect to the bunch to which the wrapper is to be applied and including a belt having a winding operation in opposite directions, means for moving the belt, an actuator and controller simulating in shape the contour of the bunch to which the wrapper is to be applied and having imparted thereto a rotary movement at intervals, a flexible connection between the actuator and controller and the means for moving the belt in opposite directions, and means engaged by the said flexible connection for changing the position of the latter in accordance with the change of position of the wrapper holder and feeder.

34. In a cigar making machine, the combination of a wrapper holder and feeder having a belt and supporting means, reversely operating winding devices for the belt, a rotary winding element geared to said winding devices, a motion controller on which the supporting means has longitudinal and lateral movements, the motion controller having imparted thereto a horizontal swing in opposite directions and a vertical movement, an actuator and controller simulating in shape the contour of the bunch to which the wrapper is to be applied and having a rotary movement imparted thereto at intervals, a flexible connection between the actuator and controller and rotary element, and mechanism coöperating with the flexible connection for causing the latter to always maintain the same position in relation to the wrapper holder and feeder irrespective of the change of angle of the latter and the supporting means therefor.

35. In a cigar making machine, the combination of a wrapper holder and feeder having a universal movement with respect to the bunch to which the wrapper is to be applied, the said holder and feeder including a belt moving in opposite directions, a fulcrumed compensator, a regulator consisting of an arm at the outer end of which the compensator is fulcrumed and having a slot in its inner end, a guide and holding means with which the inner end of the arm engages, the said arm also having a depending projection, an actuator and controller having rotary movement at intervals and simulating in shape the contour of the bunch to which the wrapper is to be applied, a flexible connection secured to the actuator and controller and passing over the compensator and coöperating with the said belt, and a motion controller for the wrapper holder and feeder engaged by the projection of the said arm.

36. In a cigar making machine, the combination of a wrapper holder and feeder having a table, tubular standards and a hollow base with an elongated opening in the bottom thereof, and a motion controller on which the said base is slidable inwardly and outwardly and also movable laterally and having an opening therethrough communicating with that in the base and with suction means, the motion controller having mechanism to operate the same horizontally in opposite directions in an arcuate path.

37. In a cigar making machine, means for holding and rotating a bunch, and a wrapper holder and feeder having mechanism to operate the same at an angle to the longitudinal axis of the bunch and also inwardly and outwardly with relation to the latter, the wrapper being moved from the holder and feeder by means independent of the means for holding and rotating the bunch.

38. In a cigar making machine, rotary means for holding a bunch, a wrapper holder and feeder having one terminal held adjacent to said rotary means, and mechanism for moving the end of the wrapper feeder adjacent to the means in a curvilinear path lengthwise of the bunch and also for moving the wrapper gradually off the feeder independently of the pulling tension of the bunch holding means and bunch.

39. In a cigar making machine, means for holding and rotating the bunch, a wrapper holder and feeder from which the wrapper is fed and has a movement independently of any pulling tension of the bunch holding means and bunch, and mechanism for operating the wrapper holder and feeder to cause one extremity thereof to move in a curvilinear path and also at an angle to the longitudinal axis of the bunch.

40. In a cigar making machine, means for holding and rotating a bunch, a wrapper holder and feeder having one extremity adjacent to said means and from which the wrapper is gradually fed independently of any pulling tension of the bunch holding means, and mechanism coöperating with the wrapper holder and feeder to move the latter in a curvilinear path longitudinally of the bunch, at varying angles to the longitudinal axis of the bunch and inwardly and outwardly in relation to the latter.

41. In a cigar making machine, the combination with wrapper feeding and wrapper applying mechanism, of an auxiliary wrapper controlling mechanism including a swinging arm having a perforate head to bear on the wrapper when the latter is being applied to different portions of the bunch, and suction means coöperating with the said head.

42. In a cigar making machine, the combination with wrapper feeding and applying mechanism, of a pivoted arm automatically movable lengthwise over a bunch held by the applying mechanism and movable independently of the wrapper feeding mechanism and having a head to bear on the wrapper as the latter is moving toward and over different parts of the bunch.

43. In a cigar making machine, the combination with wrapper feeding and applying mechanisms, of wrapper controlling mechanism movable independently of the wrapper feeding and applying mechanisms and including a swinging arm having a head to engage a wrapper as the latter is moving toward and over different parts of the bunch, and means for actuating the said arm.

44. In a cigar making machine, the combination with wrapper feeding and applying mechanisms, of wrapper controlling mechanism independent of the wrapper feeding mechanism and located to operate in conjunction with said wrapper feeding mechanism and including a slide shiftable in opposite directions, a pivotally supported member connected to said slide to bear on the wrapper as the latter is being fed to different parts of the bunch and disposed over the wrapper applying mechanism adjacent to the delivery end of the wrapper feeding mechanism, and means carried by the wrapper feeding mechanism for moving a wrapper into the wrapper applying mechanism.

45. In a cigar making machine, the combination with wrapper applying mechanism, and means for holding and shifting a wrapper into the said wrapper applying mechanism, of an auxiliary wrapper controlling device independent of the said means for shifting the wrapper into the wrapper applying mechanism and disposed over the latter to engage the exterior portion of the wrapper and having suction means coöperating directly therewith, the said auxiliary wrapper controlling device holding the wrapper in firm association with the bunch while the wrapper is being applied to the latter.

46. In a cigar making machine, the combination with wrapper applying mechanism and wrapper feeding means operating as the main wrapper controlling means, of an auxiliary wrapper controlling device independent of the wrapper feeding means to engage the exterior portion of the wrapper and having suction means coöperating directly therewith and operating to hold the wrapper in firm association with the bunch.

47. In a cigar making machine, the combination with wrapper applying mechanism, and means for feeding a wrapper, of controlling mechanism for a wrapper including a slide movable in opposite directions, and a pivotally mounted automatically falling and rising head connected to the said slide and provided with perforations and suction means.

48. In a cigar making machine, the combination with wrapper applying mechanism, of controlling mechanism for a wrapper consisting of a swinging head, a slide movable in opposite directions and connected to said head, and an arm pivoted in the head for vertical movement and carrying a pressure head at its free end.

49. In a cigar making machine, the combination with wrapper applying mechanism, of controlling mechanism for a wrapper consisting of a swinging head, a slide movable in opposite directions and connected to said head, and an arm pivoted in the head for gravitating movement and carrying a pressure head at its free end.

50. In a cigar making machine, the combination with wrapper applying mechanism, of controlling mechanism for a wrapper consisting of a swinging head, a movable device for operating said head, a gravitating arm movably connected at one end to the head and carrying a pressure head at its opposite end, and a downwardly inclined track with which the arm engages, the said track being also transversely curved.

51. In a cigar making machine, the combination with wrapper applying mechanism, of controlling mechanism for a wrapper consisting of a swinging head, a movable device for operating said head, a gravitating arm movably connected at one end to the head and carrying an intermediate roller and a pressure head at its free end, and a downwardly inclined track with which the roller engages, the track being also transversely curved.

52. In a cigar making machine, the combination with wrapper applying mechanism, of controlling mechanism consisting of a slide having a projection at its outer end, a cam having an enlargement to coöperate with said projection, a spring engaging the slide and moving the same in opposition to the actuation thereof by the cam, a swinging head to which the slide is movably attached, and a gravitating arm having one end pivotally disposed in the said swinging head and provided with a perforate head at its free end.

53. In a cigar machine, the combination with wrapping mechanism including wrapper feeding means, of a wrapper controlling means independent of the wrapper feeding means to engage the wrapper during its application to different parts of a bunch and operative to assume different angles to give the wrapper a corresponding angular position with relation to the bunch.

54. In a cigar making machine, the combination with a wrapper feeding mechanism and wrapper applying mechanism, of rotary patterning elements for forming a head on the end of a wrapper, and a clipper coöperating therewith at timed intervals to remove the surplus wrapper.

55. In a cigar making machine, the combination with wrapper feeding mechanism and wrapper applying mechanism, of oppositely rotating elements for patterning a head on the end of a wrapper, and a clipper coöperating therewith to remove the surplus wrapper.

56. In a cigar making machine, the combination with a wrapper feeding mechanism and wrapper applying mechanism, of rotary patterning elements for forming a head on the end of a wrapper, and a clipper coöperating therewith to remove the surplus wrapper.

57. In a cigar making machine, the combination with a wrapper feeding mechanism and wrapper applying mechanism, of automatically movable oppositely rotating elements for positively engaging and patterning a head on the end of a wrapper and having a reverse speed of rotation imparted thereto exceeding that of the bunch to release the head end of the wrapper, and a clipper coöperating with said elements to remove the surplus wrapper.

58. In a cigar making machine, the combination with a wrapper feeding mechanism, of oppositely moving elements for preparing the head end of a wrapper having means for automatically elevating and depressing the same at proper timed intervals, and a clipper coöperating therewith to remove the surplus wrapper.

59. In a cigar making machine, the combination with a wrapper feeding mechanism, of automatically movable oppositely rotating elements for patterning a head at one extremity of a wrapper, and an automatically movable clipper coöperating therewith.

60. In a cigar machine, the combination with rotary bunch supporting means, of rotary means for engaging, raising, shaping and exerting a proper tension on the head extremity of a wrapper during the continuous rotation of the bunch and said supporting means.

61. In a cigar machine, bunch supporting and rotating means, and rotary means for engaging and shaping the head extremity of a wrapper during the rotation of the bunch, and supporting and actuating means for the latter, said rotary means having automatically advancing and receding movements with respect to the said supporting means and the bunch supported thereby.

62. In a cigar machine, wrapper feeding mechanism, bunch supporting and rotating means, and rotary means for automatically engaging, supporting and shaping the head extremity of a wrapper after it has been liberated from the feeding mechanism and during the continuous movement of the bunch supporting and rotating means and the bunch held by the latter.

63. In a cigar making machine, the combination with a wrapper applying mechanism, of rotary head forming elements, and a shear-like clipper, the said elements and clipper operating to form the head end of the wrapper during movement of the latter.

64. In a cigar making machine, the combination with a wrapper applying mechanism, of rotary elements for cutting the head end of a wrapper, mechanism for automatically advancing and withdrawing the said elements relative to the said holding means and also for reversing the movement thereof, and a clipper coöperating with the elements.

65. In a cigar making machine, the combination with a wrapper applying mechanism, of rotary elements for cutting the head end of a wrapper, a longitudinally shiftable shaft for operating the elements, a slide supporting the elements, means for reversing the rotary movement of the shaft and the elements, and a clipper coöperating with the elements.

66. In a cigar making machine, the combination with a wrapper applying mechanism, of rotary elements for cutting the head end of a wrapper, longitudinally shiftable means carrying the said elements, mechanism for rotating the elements and also reversing the direction of rotation thereof, and a clipper coöperating with said elements.

67. In a cigar making machine, the combination with a wrapper applying mechanism, of rotary elements for cutting the head end of a wrapper, a reversely rotatable longitudinally movable shaft for operating said elements, a slide device supporting both elements, mechanism for operating the shaft and slide device, and a clipper.

68. In a cigar making machine, the combination with a wrapper applying mechanism, of head forming elements, a reversely movable shaft for operating said elements, a slide device supporting the elements and operating to longitudinally shift the shaft, independent gears loosely disposed on the shaft, a shifting member to throw either of the gears in connection with the shaft, a combined rotary cam disk and gear for operating the slide device and having two rims of bevel teeth in concentric relation engaged by the said gears, and a clipper controlled as to its operation by the combined rotary cam disk and gear.

69. In a cigar making machine, the combination with a wrapper applying mechanism, of rotary cutters for preparing the head end of a wrapper, a slide carrying the cutters, a shaft extending through and longitudinally shiftable by the slide, a combined rotary cam disk and gear coöperating with the slide and shaft and provided with inner and outer concentric rims of bevel teeth, bevel pinions loose on the shaft and having clutch members, said bevel pinions being respectively held in mesh with the rims of bevel teeth, a double clutch element longitudinally shiftable on the shaft by the rotary cam disk and gear, the said clutch element having a portion thereof secured to rotate with the shaft and the remaining portion movably surrounding the former portion and having means for preventing rotation thereof, and a clipper controlled as to its movement by the said rotary cam disk and gear.

70. In a cigar making machine, the combination with a wrapper applying mechanism, of rotary cutters for preparing the head end of a wrapper, the one cutter having a flange overlapping the other, means for elevating and depressing the cutters at intervals, and a clipper coöperating with the cutters.

71. In a cigar making machine, the combination with a wrapper applying mechanism, of rotary cutters for preparing the head end of a wrapper having gear devices directly adjacent and operating therewith, means for actuating said gear devices, guards surrounding the gear devices, and a clipper coöperating with the cutters.

72. In a cigar making machine, the combination with a wrapper applying mechanism, of rotary cutters for preparing the head end of a wrapper, a shaft for operating the cutters and having pinions loosely disposed thereon and held apart from each other, the said pinions having inner opposing clutch means, a double clutch member longitudinally shiftable on the shaft and having a portion rotatable with the latter, a slide engaging the shaft for longitudinally moving the latter and also carrying the cutters, a rotary cam disk and gear having cam grooves in its opposite faces, of different contour and timed operation, for actuating the slide and clutch member and also having concentric rims of bevel teeth engaged by the pinions, and a clipper coöperating with the cutters.

73. In a cigar making machine, the combination with wrapper applying mechanism, of reversely rotating cutting devices for preparing the head extremity of a wrapper, a longitudinally movable shaft for operating said devices and having an intermediate pinion thereon and also means for rotating one of the cutting devices, a slide operating to move the shaft and having the cutting devices on its upper terminal, motion transmitting and counter-shafts held by the slide and geared to each other and to the other cutting device and said intermediate pinion on the shaft, mechanism for imparting rotation in opposite directions to the shaft and actuating the slide, and a clipper coöperating with the cutting devices.

74. In a cigar machine, the combination with wrapper applying means, mechanism for patterning and maintaining the head extremity of a wrapper under tension, and bunch holding and operating means continuously actuated together with the bunch therein during the operation of said mechanism.

75. In a cigar machine, the combination with wrapper applying means, mechanism for simultaneously patterning and maintaining the free head extremity of a wrapper under tension, and bunch holding and operating means continuously actuated together with the bunch therein during the operation of said mechanism.

76. In a cigar machine, the combination with wrapper applying means, mechanism for patterning and maintaining the free head extremity of a wrapper under tension, consisting of slitting means and a clipping device, and bunch holding and operating means continuously actuated together with the bunch therein during the operation of said mechanism.

77. In a cigar machine, the combination with wrapper applying mechanism, of rotary cutters for patterning a head, and an opening and closing clipper coöperating with said cutters.

78. In a cigar making machine, the combination with wrapper applying mechanism, of head patterning mechanism consisting of rotary cutters, and a clipper having elevating and depressing movements at timed intervals.

79. In a cigar making machine, the combination with wrapper applying mechanism, of head patterning mechanism consisting of reversely rotating cutting devices, and a clipper having maximum and partial elevating and depressing movements at timed intervals.

80. In a cigar making machine, the combination with wrapper applying mechanism, of head patterning mechanism consisting of reversely rotating cutting devices, and a clipper having elevating and depressing movements at timed intervals.

81. In a cigar making machine, the combination with wrapper applying mechanism having rotary elements, of head patterning mechanism consisting of reversely operating rotary cutters having means for causing the same to have advancing and receding movements, the cutters when receding having a greater speed of rotation than the rotary elements of the said mechanism and the bunch, and a clipper having elevating and depressing movements at timed intervals.

82. In a cigar making machine, the combination with wrapper applying mechanism, of head patterning mechanism consisting of rotary cutters operating to slit and hold the head end of a wrapper, and a clipper coöperating with the said cutters and actuated to slit the head end of a wrapper while the latter is held by the cutters at the terminal of the slit formed by the latter.

83. In a cigar making machine, the combination with wrapper applying mechanism, of head patterning mechanism consisting of rotary cutters for forming a slit in the head end of a wrapper, mechanism for operating said cutters, a clipper having opening and closing blades, an arm on which said blades are fulcrumed, an actuating lever for opening and closing the blades, and a cam having grooves therein of such contour as to cause the arm to elevate the clipper and the actuating lever to open and close the blades, the said cam being geared to the operating mechanism for the cutters.

84. In a cigar making machine, the combination with wrapper applying mechanism, of head patterning mechanism consisting of reversely rotating cutters, means for operating said cutters, a clipper having opening and closing members, an elevating arm carrying the clipper, means for opening and closing the members of the clipper, and mechanism for actuating said arm and means for opening and closing the members of the clipper.

85. In a cigar making machine, the combination with wrapper applying mechanism, of head patterning mechanism consisting of rotary cutters, a clipper coöperating with the said cutters, an arm for elevating and depressing the clipper, a lever for opening and closing the members of the clipper, and means for actuating the said arm and lever in timed relation to the movement of the cutters.

86. In a cigar machine, mechanism for patterning the head end of a wrapper including slitting devices having frictional bearing surfaces to maintain the wrapper extremity under tension, and bunch holding and wrapper applying means with which said mechanism coöperates.

87. In a cigar machine, mechanism for patterning and maintaining the head end of a wrapper under tension including a pair of rotary cutters having frictional bearing surfaces, and bunch holding and wrapper applying means with which said mechanism coöperates.

88. In a cigar making machine, the combination with rotary wrapper applying mechanism, of head patterning mechanism consisting of rotary cutters, a shaft for operating the cutters, a slide supporting the cutters, mechanism for operating said shaft in reverse directions and moving the slide including a cam disk and gear having peripheral teeth, a clipper having opening and closing blades, a bell-crank arm pivotally supporting the clipper, an actuating lever for moving the blades of the clipper, and a cam disk and gear having grooves into which portions of the outer ends of the bell-crank arm and actuating lever extend to respectively elevate the arm and shift the lever, this latter cam disk and gear having peripheral teeth meshing with those of the cam disk and gear coöperating with the slide and shaft of the rotary cutters.

89. In a cigar making machine, the combination with wrapper applying and wrapper feeding mechanisms, of a wrapper controlling device to engage the exterior portion of a wrapper during the application of the latter to a bunch and operating independently of the wrapper feeding mechanism and provided with operating means whereby the wrapper controlling device is caused to conform to the shape of the bunch.

90. In a cigar making machine, the combination with wrapper applying mechanism and bunch holding means, of head forming mechanism, and an extra finishing device for the end of the cigar having an inner open fingered end, and means for causing the said device to move inwardly and outwardly at intervals with respect to the bunch holding means.

91. In a cigar making machine, the combination with wrapper applying mechanism and means for holding a completed cigar, of an operating slidable and rotatable rod carrying fingers at its inner end to engage the head end of the completed cigar and further finish such end, and means for imparting sliding and rotary movements to the said rod.

92. In a cigar machine, the combination with wrapper applying mechanism, of mechanism for continuously moving the wrapper from the forming mechanism therefor to the applying mechanism, and head end patterning devices for the wrapper which operate to properly shape the said head end of the wrapper during the movement of the latter.

93. In a cigar machine of the class set forth, a swinging carrier for a wrapper provided with longitudinally shiftable means for feeding a wrapper therefrom independent of any pulling tension of other mechanism, said carrier also acting as a depressor and guide for the wrapper.

94. A cigar wrapper holding and feeding means provided with longitudinally shiftable means for feeding a wrapper therefrom independent of any pulling tension of other mechanism, a support on which said means is movable, and mechanism for horizontally swinging the support.

In testimony whereof I have hereunto set my hand in presence of two subscribing witnesses.

JOSEPH D. LACROIX.

Witnesses:
GEORGE G. SCHREIBER,
W. B. SYMENES, Jr.

Copies of this patent may be obtained for five cents each, by addressing the "Commissioner of Patents, Washington, D. C."